United States Patent
Weising et al.

(10) Patent No.: US 10,424,077 B2
(45) Date of Patent: Sep. 24, 2019

(54) MAINTAINING MULTIPLE VIEWS ON A SHARED STABLE VIRTUAL SPACE

(71) Applicant: Sony Interactive Entertainment America LLC, San Mateo, CA (US)

(72) Inventors: George Weising, Culver City, CA (US); Thomas Miller, Los Angeles, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 29 days.

(21) Appl. No.: 15/089,360

(22) Filed: Apr. 1, 2016

(65) Prior Publication Data
US 2016/0214011 A1 Jul. 28, 2016

Related U.S. Application Data

(63) Continuation of application No. 14/260,216, filed on Apr. 23, 2014, now Pat. No. 9,310,883, which is a (Continued)

(51) Int. Cl.
*A63F 9/24* (2006.01)
*G06T 7/70* (2017.01)
(Continued)

(52) U.S. Cl.
CPC .................. *G06T 7/70* (2017.01); *A63F 3/02* (2013.01); *A63F 9/24* (2013.01); *A63F 13/00* (2013.01);
(Continued)

(58) Field of Classification Search
CPC . G06F 3/01; G06F 3/014; G07F 17/32; G07F 17/3202; G07F 17/3204; G07F 17/3211
See application file for complete search history.

(56) References Cited

U.S. PATENT DOCUMENTS 6,522,312 B2  2/2003  Ohshima et al. ............... 345/8
6,972,734 B1  12/2005  Ohshima et al. ............... 345/8
(Continued)

FOREIGN PATENT DOCUMENTS

CN  101174332 A  5/2008  ............ G06T 17/00

OTHER PUBLICATIONS

Chinese App. No. 201610220654.4, Jun. 27, 2018, Issuing No. 2018062201695320, the Second Office Action.

*Primary Examiner* — James S. McClellan
*Assistant Examiner* — Kevin M Carter
(74) *Attorney, Agent, or Firm* — Penilla IP, APC

(57) ABSTRACT

Methods, apparatus, and computer programs for controlling a view of a virtual scene with a handheld device are presented. In one method, images of a real world scene are captured using a device. The method further includes operations for creating an augmented view for presentation on a display of the device by augmenting the images with virtual reality objects, and for detecting a hand in the images as extending into the real world scene. In addition, the method includes operations for showing the hand in the screen as detected in the images, and for generating interaction data, based on an interaction of the hand with a virtual reality object, when the hand makes virtual contact in the augmented view with the virtual reality object. The augmented view is updated based on the interaction data, which simulates on the screen that the hand is interacting with the virtual reality object.

20 Claims, 29 Drawing Sheets

Related U.S. Application Data continuation of application No. 12/947,290, filed on Nov. 16, 2010, now Pat. No. 8,730,156.

(60) Provisional application No. 61/323,762, filed on Apr. 13, 2010, provisional application No. 61/311,251, filed on Mar. 5, 2010.

(51) Int. Cl.

| | | |
|---|---|---|
| *G09G 5/08* | (2006.01) | |
| *A63F 13/00* | (2014.01) | |
| *G06F 3/01* | (2006.01) | |
| *G06T 19/00* | (2011.01) | |
| *H04N 5/232* | (2006.01) | |
| *G06F 3/03* | (2006.01) | |
| *G06F 3/0481* | (2013.01) | |
| *G06F 3/0346* | (2013.01) | |
| *A63F 13/40* | (2014.01) | |
| *A63F 13/50* | (2014.01) | |
| *A63F 3/02* | (2006.01) | |
| *G06T 7/20* | (2017.01) | |

(52) U.S. Cl.
CPC .............. *A63F 13/40* (2014.09); *A63F 13/50* (2014.09); *G06F 3/011* (2013.01); *G06F 3/012* (2013.01); *G06F 3/017* (2013.01); *G06F 3/0304* (2013.01); *G06F 3/0346* (2013.01); *G06F 3/04815* (2013.01); *G06T 7/20* (2013.01); *G06T 19/006* (2013.01); *G09G 5/08* (2013.01); *H04N 5/23258* (2013.01); *A63F 2009/2457* (2013.01); *G06T 2207/10028* (2013.01); *G09G 2320/0261* (2013.01)

(56) References Cited

U.S. PATENT DOCUMENTS

| | | | | |
|---|---|---|---|---|
| 7,532,224 | B2 | 5/2009 | Bannai | .......................... 345/633 |
| 9,703,369 | B1* | 7/2017 | Mullen | ..................... G06F 3/01 |
| 2003/0156144 | A1* | 8/2003 | Morita | ..................... G06F 3/011 |
| | | | | 715/848 |
| 2006/0227151 | A1 | 10/2006 | Bannai | .......................... 345/633 |
| 2006/0257420 | A1 | 11/2006 | Zimmerman | ............... 424/185.1 |
| 2007/0188444 | A1* | 8/2007 | Vale | ....................... G06F 3/0421 |
| | | | | 345/156 |
| 2008/0062169 | A1* | 3/2008 | Heesemans | ........... G06F 3/0412 |
| | | | | 345/420 |
| 2008/0136775 | A1* | 6/2008 | Conant | .................... G06F 3/014 |
| | | | | 345/156 |
| 2010/0053151 | A1* | 3/2010 | Marti | ...................... G06F 3/011 |
| | | | | 345/419 |
| 2010/0149090 | A1* | 6/2010 | Morris | .................... G06F 3/017 |
| | | | | 345/156 |
| 2010/0287485 | A1* | 11/2010 | Bertolami | ............... G06F 3/011 |
| | | | | 715/764 |
| 2010/0315413 | A1* | 12/2010 | Izadi | ....................... G06F 3/017 |
| | | | | 345/419 |
| 2014/0152869 | A1* | 6/2014 | Solotko | .................. G06Q 10/10 |
| | | | | 348/231.3 |
| 2014/0184496 | A1* | 7/2014 | Gribetz | ................ G02B 27/017 |
| | | | | 345/156 |
| 2016/0210784 | A1* | 7/2016 | Ramsby | ................. G06T 19/006 |
| 2016/0350973 | A1* | 12/2016 | Shapira | ................. G06T 19/006 |

* cited by examiner

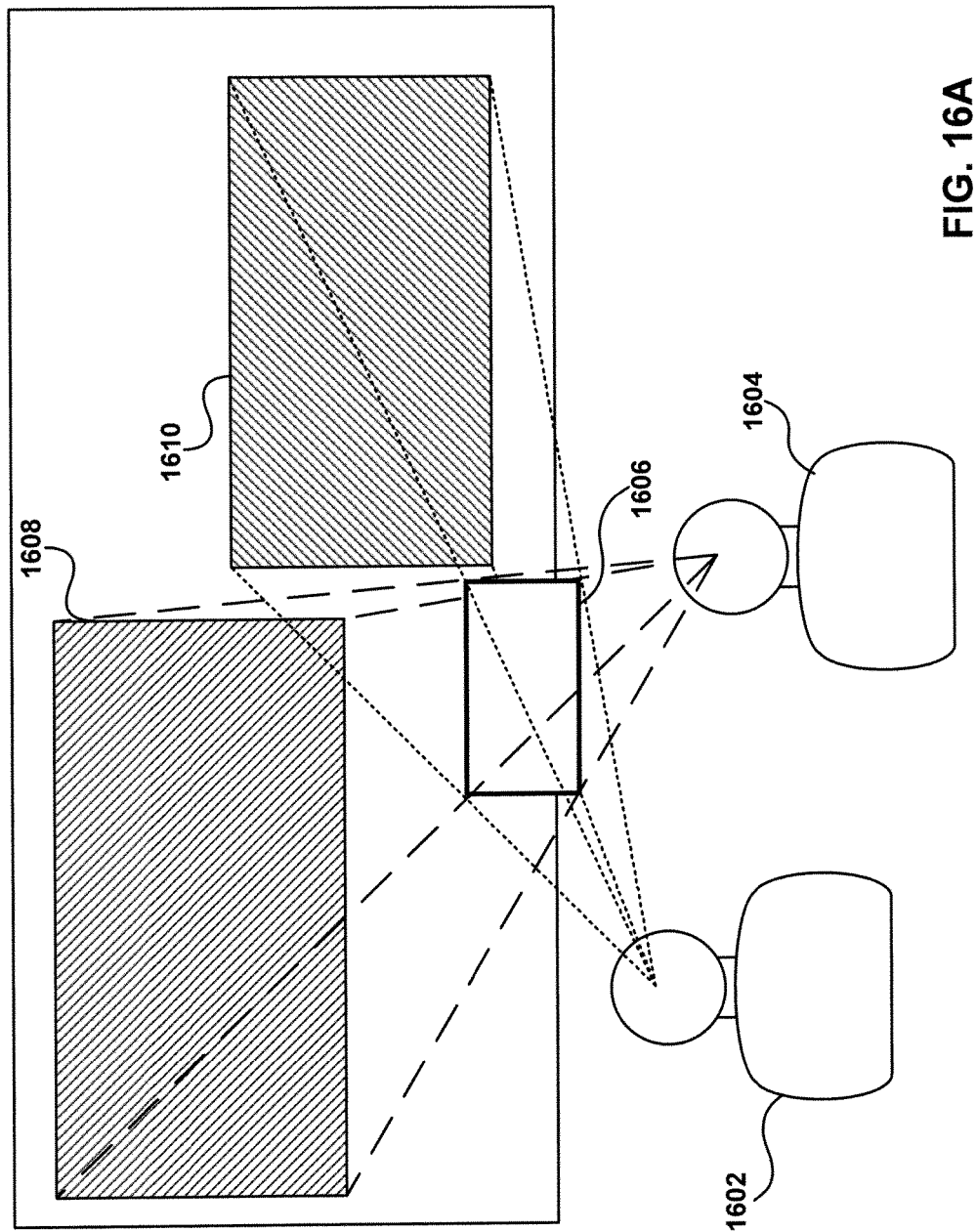

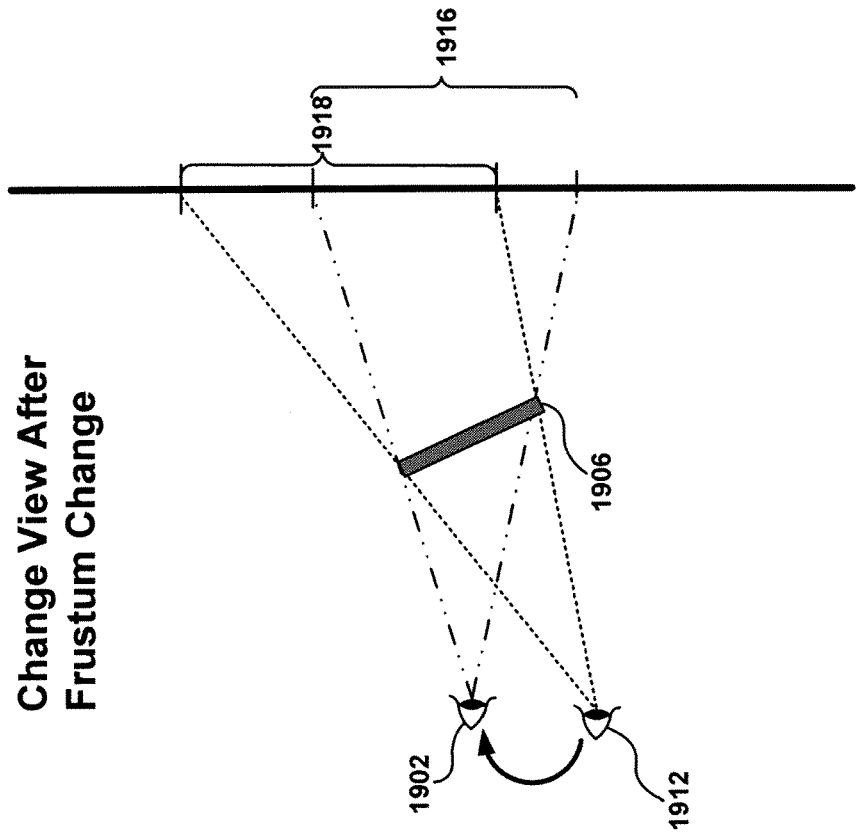
FIG. 19B Change View After Frustum Change
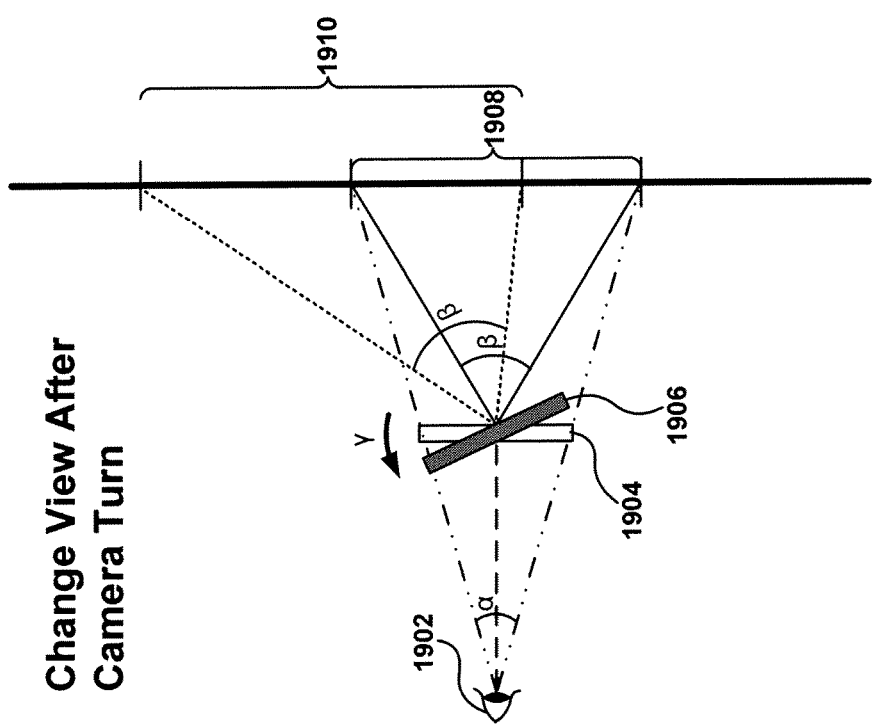
FIG. 19A Change View After Camera Turn

MAINTAINING MULTIPLE VIEWS ON A SHARED STABLE VIRTUAL SPACE

CLAIM OF PRIORITY

This application is a Continuation application under 35 USC § 120 of U.S. application Ser. No. 14/260,216, entitled, "Maintaining Multiple Views on a Shared Stable Virtual Space," filed Apr. 23, 2014, which is a Continuation application of U.S. application Ser. No. 12/947,290, entitled "Maintaining Multiple Views on a Shared Stable Virtual Space," filed Nov. 16, 2010, which claims priority from U.S. Provisional Patent Application No. 61/311,251, filed Mar. 5, 2010, entitled "Maintaining Multiple Views on a Shared Stable Virtual Space," and from U.S. Provisional Patent Application No. 61/323,762, filed Apr. 13, 2010, entitled "Calibration of Portable Devices in a Shared Virtual Space," all of which are incorporated herein by reference.

BACKGROUND

1. Field of the Invention

The present invention relates to methods, devices, and computer programs for controlling a view of a virtual scene with a portable device, and more particularly, methods, devices, and computer programs for enabling multiplayer interaction in a virtual or augmented reality.

2. Description of the Related Art

Virtual reality (VR) is a computer-simulated environment, whether that environment is a simulation of the real world or an imaginary world, where users can interact with a virtual environment or a virtual artifact (VA) either through the use of standard input devices or specialized multidirectional input devices. The simulated environment can be similar to the real world, for example, simulations for pilot or combat training, or it can differ significantly from reality, as in VR games. Virtual Reality is often used to describe a wide variety of applications, commonly associated with its immersive, highly visual, 3D environments. The development of Computer Aided Design (CAD) software, graphics hardware acceleration, head-mounted displays, database gloves, and miniaturization have helped popularize the notion.

Augmented Reality (AR) provides a live view of a physical real-world environment whose elements are merged with (or augmented by) virtual computer-generated imagery to create a mixed reality. The augmentation is conventionally in real-time and in semantic context with environmental elements, such as sports scores on television during a match. With the help of advanced AR technology (e.g. adding computer vision and object recognition) the information about the surrounding real world of the user becomes interactive and digitally usable.

The term Augmented Virtuality (AV) is also used in the virtual reality world and is similar to AR. Augmented Virtuality also refers to the merging of real world objects into virtual worlds. As an intermediate case in the Virtuality Continuum, AV refers to predominantly virtual spaces, where physical elements, e.g. physical objects or people, are dynamically integrated into, and can interact with the virtual world in real-time. The term VR is used in this application as a generic term that also encompasses AR and AV, unless otherwise specified.

VR games typically required a large amount of computer resources. Implementation in handheld devices of VR games is rare and the existing games are rather simplistic with rudimentary VR effects. Additionally, multiplayer AR games allow for the interaction of players in a virtual world, but the interactions are limited to objects manipulated by the player in the virtual world (e.g., cars, rackets, balls, etc.) The virtual world is computer generated and independent of the location of the players and the portable devices. The relative location of the players with respect to each other and with respect to their surroundings is not taken into account when creating a "realistic" virtual reality experience.

It is in this context that embodiments of the invention arise.

SUMMARY

Embodiments of the present invention provide methods, apparatus, and computer programs for controlling a view of a virtual scene with a portable device. It should be appreciated that the present invention can be implemented in numerous ways, such as a process, an apparatus, a system, a device or a method on a computer readable medium. Several inventive embodiments of the present invention are described below.

In one embodiment of a method, a signal is received and the portable device is synchronized to make the location of the portable device a reference point in a three-dimensional (3D) space. A virtual scene, which includes virtual reality elements, is generated in the 3D space around the reference point. Further, the method determines the current position in the 3D space of the portable device with respect to the reference point and creates a view of the virtual scene. The view represents the virtual scene as seen from the current position of the portable device and with a viewing angle based on the current position of the portable device. Additionally, the created view is displayed in the portable device, and the view of the virtual scene is changed as the portable device is moved by the user within the 3D space. In another method, multiple players shared the virtual reality and interact among each other view the objects in the virtual reality.

In yet another embodiment, a method is presented for sharing a virtual scene among devices. The method includes operations for synchronizing a first device to a reference point in a three-dimensional (3D) space and for calculating a location of a second device relative to the location of the first device. Further, an operation of the method includes the exchange of information between the first device and the second device to have the second device synchronized to the reference point in the 3D space. The information includes the reference point and the locations of both first and second devices. Additionally, a method operation is used for generating a virtual scene in the 3D space around the reference point. The virtual scene is common to both devices and changes simultaneously in both devices as the devices interact with the virtual scene. A view is created of the virtual scene as seen from a current position of the first device with a viewing angle based on the current position of the portable device, and the created view is displayed on the first device. The method continues by changing the displayed view of the virtual scene as the portable device moves within the 3D space.

In yet another embodiment, a method is performed for controlling a view of a virtual scene with a first device. The method includes an operation for synchronizing the first device to a first reference point in a first three-dimensional (3D) space. In another operation, a communications link is established between the first device and a second device. The second device is in a second 3D space outside the first 3D space and is synchronized to a second reference point in the second 3D space. Further, a method operation is performed for generating a common virtual scene that includes virtual reality elements, where the common virtual scene is observable by both the first and the second devices. The first device builds the common virtual scene around the first reference point, and the second device builds the common virtual scene around the second reference point. Both devices are able to interact with the virtual reality elements. Further, the method includes operations for determining a current position in the first 3D space of the first device with respect to the reference point and for creating a view of the common virtual scene. The view represents the common virtual scene as seen from the current position of the first device and with a viewing angle based on the current position of the first device. The created view is displayed in the first device, and the displayed view of the common virtual scene changes as the first device moves within the first 3D space.

In an additional embodiment, method operations control a view of a virtual scene with a portable device. In one operation, the portable device is synchronized to a reference point in a three-dimensional (3D) space where the portable device is located. The portable device includes a front camera facing the front of the portable device and a rear camera facing the rear of the portable device. Further, an operation is performed for generating a virtual scene in the 3D space around the reference point. The virtual scene includes virtual reality elements. The current position in the 3D space of the portable device is determined with respect to the reference point. In another method operation, a view of the virtual scene is created. The view captures a representation of the virtual scene as seen from a current eye position in the 3D space of a player holding the portable device, which corresponds to what the player would see through a window into the virtual scene. The window's position in the 3D space is equal to the position in the 3D space of a display in the portable device. The method also includes operations for displaying the created view in the display, and for changing the displayed view of the virtual scene as the portable device or the player move within the 3D space.

In one more embodiment, a portable device is used for interacting with an augmented reality. The portable device includes a position module, a virtual reality generator, a view generator, and a display. The position module is used for determining a position of the portable device in a 3D space where the portable device is located, where the position of the portable device is set as a reference point in the 3D space at a time when the portable device receives a signal to synchronize. The virtual reality generator creates a virtual scene in the 3D space around the reference point. The virtual scene includes virtual reality elements. Further, the view generator that creates a view of the virtual scene, where the view represents the virtual scene as seen from the position of the portable device and with a viewing angle based on the position of the portable device. Additionally, the display is used for showing the view of the virtual scene. The view shown in the display changes as the portable device moves within the 3D space.

In other embodiments, computer programs embedded in a computer-readable storage medium, when executed by one or more processors, are used for implementing methods of the invention.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 16A-16B illustrate the effects of changing the viewing frustum as the player moves, according to one embodiment.

FIGS. 19A-19B illustrate embodiments for combining viewing frustum effect with a camera effect.

DETAILED DESCRIPTION

The following embodiments describe methods, devices, and computer programs for controlling a view of a virtual scene in a virtual or augmented reality. It will be obvious, however, to one skilled in the art, that the present invention may be practiced without some or all of these specific details. In other instances, well known process operations have not been described in detail in order not to unnecessarily obscure the present invention.

Figure 1:
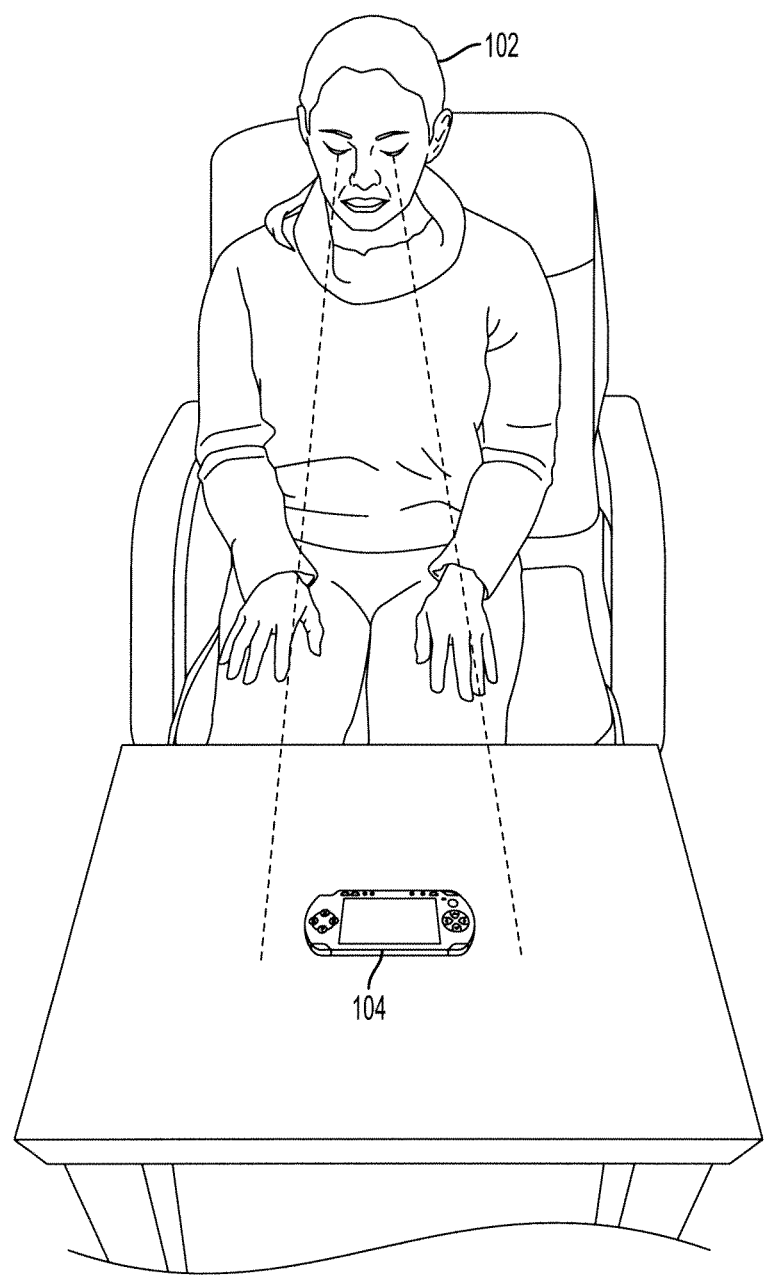
FIG. 1 depicts a user before synchronization a portable device to a reference point in space, according to one embodiment.

FIG. 1 depicts a user before synchronization a portable device to a reference point in space, according to one embodiment. Portable device 102 is standing on a table in preparation for synchronizing the portable device to a reference point. User 102 has placed the portable device in a point that will serve as a reference point or anchor to build a virtual reality around the point. In the case shown in FIG. 1, the portable device is sitting in the approximate center of a table, and a virtual world is built around the center of the table once the portable device is synchronized. The portable device can be synchronized in a variety of ways, such as pushing a button on portable device 104, touching the touch-sensitive screen in the portable device, letting the device stand still for a period of time (e.g., five seconds), entering a voice command, etc.

Once the portable device receives the input to be synchronized, position tracking modules in the portable device are reset. The portable device can include a variety of position tracking modules, as discussed below in reference to FIG. 21, such as an accelerometer, a magnetometer, a Global Positioning System (GPS) device, a camera, a depth camera, a compass, a gyroscope, etc.

The portable device can be one of many types, such as a handheld portable gaming device, a cell phone, a tablet, a notebook, a netbook, a Personal Digital Assistant (PDA), etc. Embodiments of the invention are described in reference to a portable gaming device, but the principles can be applied to any portable electronic device with a display. Principles of the invention can also be applied to game controllers or other input devices connected to a computing device with a display.

Figure 2:
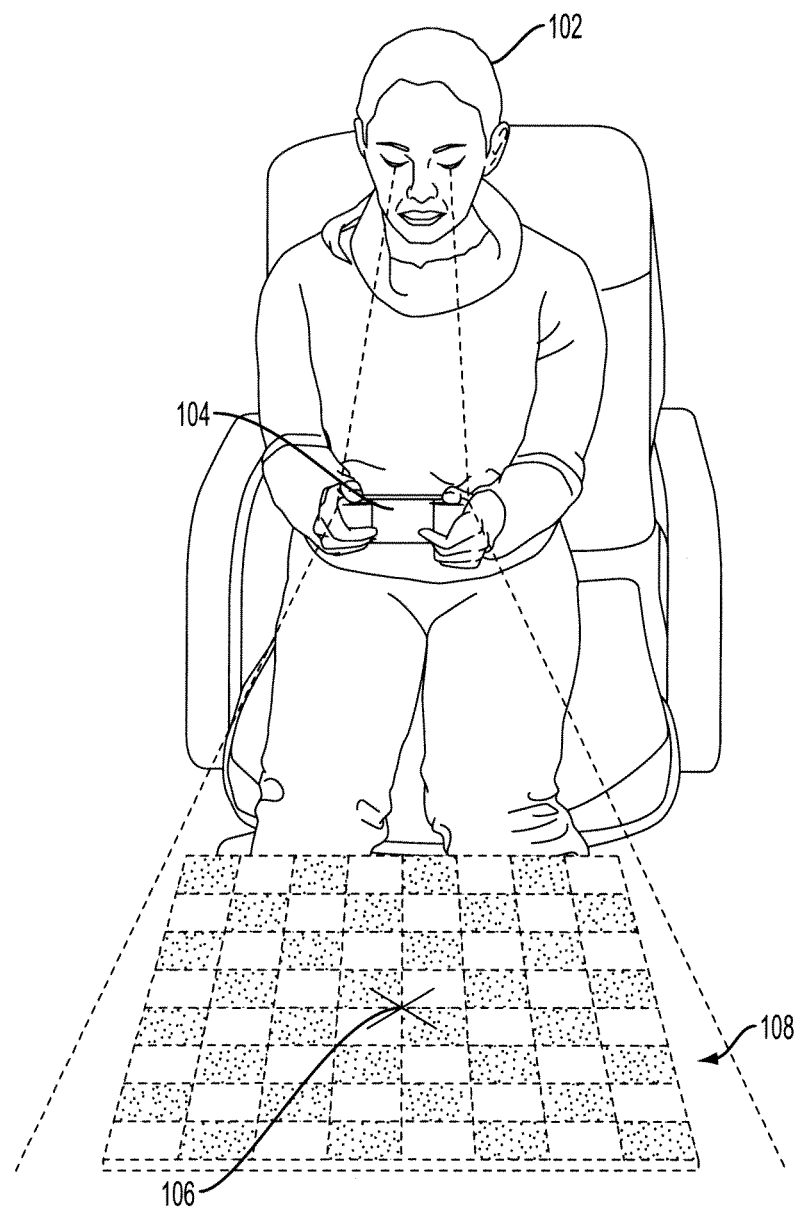
FIG. 2 illustrates a virtual reality scene observed with the portable device.

FIG. 2 illustrates a virtual reality scene observed with the portable device. After synchronizing device 104 with respect to reference points 106, the portable device will start displaying a view of the virtual reality 108. The view in the display is created by simulating that a camera in the back of the portable device moves within the 3D space around reference point 106. FIG. 2 depicts a virtual reality that includes a chess board. Portable device 104 is capable of detecting motion and determining its relative position with respect to reference point 106 as the device moves around. Location and position determination can be done with different methods and different levels of accuracy. For example, location can be detected by analyzing images captured with a camera, or data obtained from inertial systems, GPS, ultrasonic triangulation, WiFi communications, dead reckoning, etc., or a combination thereof.

In one embodiment, the device keeps track of the location in space of the portable device with respect to reference point 106, as well as the position in space of the portable device. The position is used to determine the viewing angle of the camera, that is, the portable device acts as a camera into the virtual scene. If the portable device is aimed towards the right, then the view will turn to the right, etc. In other words, the viewing angle is defined as a vector with origin in the center of the display (or other part of the device), and with a direction perpendicular to and away from the display. In another embodiment, only the position in space is tracked, and the view in the display is calculated as if the camera is aiming from the location in space where the portable device is located and towards the reference point.

In some existing implementations, an augmented reality (AR) tag is placed on a table, and utilized as a fiduciary marker for generating the augmented reality. The AR tag may be an object or Figure that is recognized when present in the captured image stream of the real environment. The AR tag serves as a fiduciary marker which enables determination of a location within the real environment. Embodiments to the invention eliminate the need for AR Tags, because of the synchronizing into the 3D space and the tracking of the location of the portable device. Additionally, the location information allows games in the portable device to deliver a realistic 3D virtual experience. Additionally, an array of networked portable devices can be used to create a shared virtual world, as described below in reference to FIG. 4.

Figure 3:
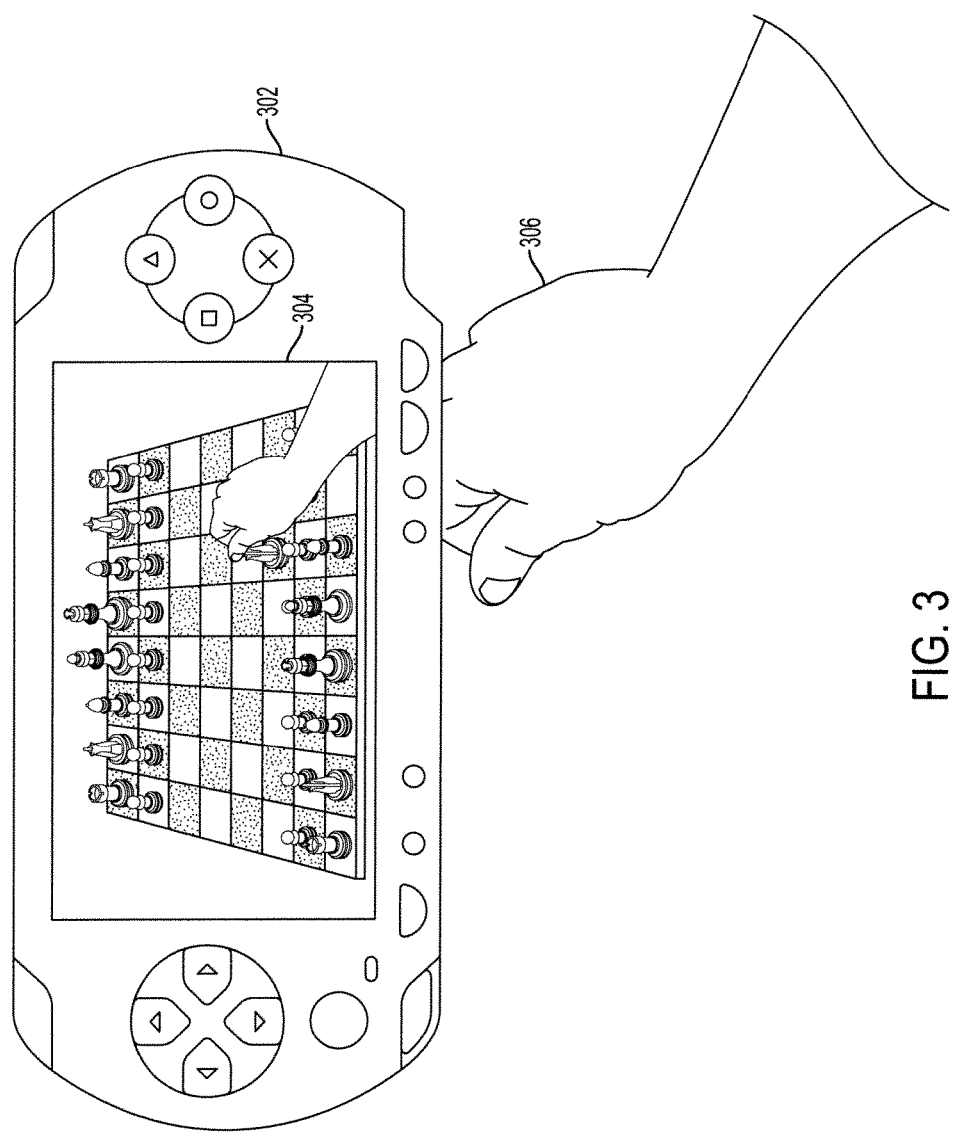
FIG. 3 illustrates an augmented reality chess game with virtual board and blended player's hand, in accordance with one embodiment.

FIG. 3 illustrates an augmented reality chess game with virtual board and blended player's hand, in accordance with one embodiment. Images of the 3D space are used to create an augmented reality by combining real and virtual elements with respect to the calibrated point and provide optical motion capture-like functionality. With a calibrated multi-camera technique it is possible to determine the position of a hand or an arm to enable players to "reach" into an augmented reality scene and interact with game objects (chess pieces).

In one embodiment, two cameras in the back of a single device are used to determine the location of objects into the 3D space. A depth-camera can also be used to obtain three-dimensional information. In other embodiment, cameras from multiple devices are used to determine hand 306 location, as discussed below in reference to FIG. 4. While holding portable 302 in one hand, players peer through screen 304 and reach into the play area that is being generated for them to touch 3D game objects and environments. Game play is completely tactile. It is possible for multiple players to reach into a play area at the same time and interact with game objects in sophisticated ways. For example, hand 306 of a player can interact with a virtual object by interfacing, holding, pushing, pulling, grabbing, moving, smashing, squeezing, hitting, throwing, fighting, opening, closing, turning on or off, pushing a button, firing, eating, etc.

Each portable device that is synchronized to a play area adds another potential camera, relative motion tracking and ping data, making it possible to see players hands and fingers from multiple perspectives to create an effective 3D camera-based motion capture field. The hand and the virtual space are blended together, where the virtual elements in the virtual space appear in the displayed view as if the virtual elements where part of the 3D space. The view of the virtual elements changes, from a geometrical perspective, in the same way as the view of the real elements changes when the portable device moves within the 3D space.

Figure 4:
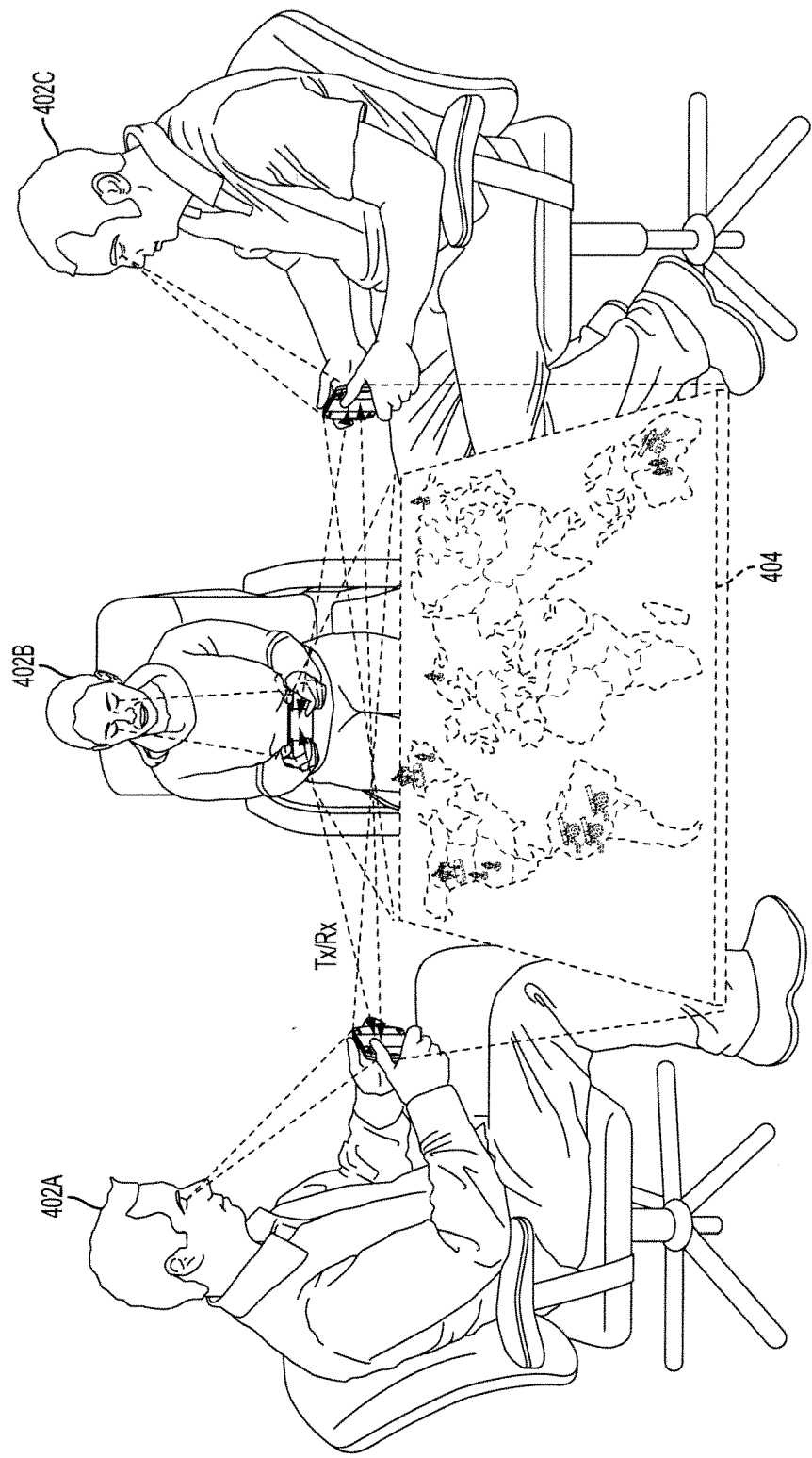
FIG. 4 depicts a multi-player virtual reality game, according to one embodiment.

FIG. 4 depicts a multi-player virtual reality game, according to one embodiment. When calibrated positional and image analysis data is combined with high speed connectivity, positional and game information can be exchanged between each of the devices that choose to participate in a shared-space game experience. This allows each player's system access to the camera view and positional information from all other players to synchronize their calibrated positions and share a virtual space, also referred to as shared space, together.

After players 402A-402C have synchronized or calibrated their portable devices in reference to a point in the common 3D space (such as a point on a table), the common virtual scene 404 is created. Each player has a view of the virtual scene 404 as if the virtual scene, a battle board game in this case, were real on a table in front of the players. The portable devices act as cameras, such that when the player moves the device around, the view changes. As a result, the actual view on each display is independent from the view in other displays and the view is based only on the relative position of the portable device in respect to the virtual scene, which is anchored to an actual physical location on the 3D space.

By utilizing multiple cameras, accelerometers and other mechanical devices to determine position, together with high speed communication between portable devices, it is possible to create a 3D motion capture-like experience allowing players to see, and possibly touch, virtual game characters and environments in believable ways.

Share Space 404 games utilize devices' high-speed connectivity to exchange information among devices participating in the Share Space game experience. The Share Space 404 play areas are viewed through the device by turning the device into a stable "magic window" that persists in a space between each of the devices. By using a combination of motion tracking, image analysis, and high persistence of information between each device, the play area appears in a stable position even if when devices move around.

Figure 5:
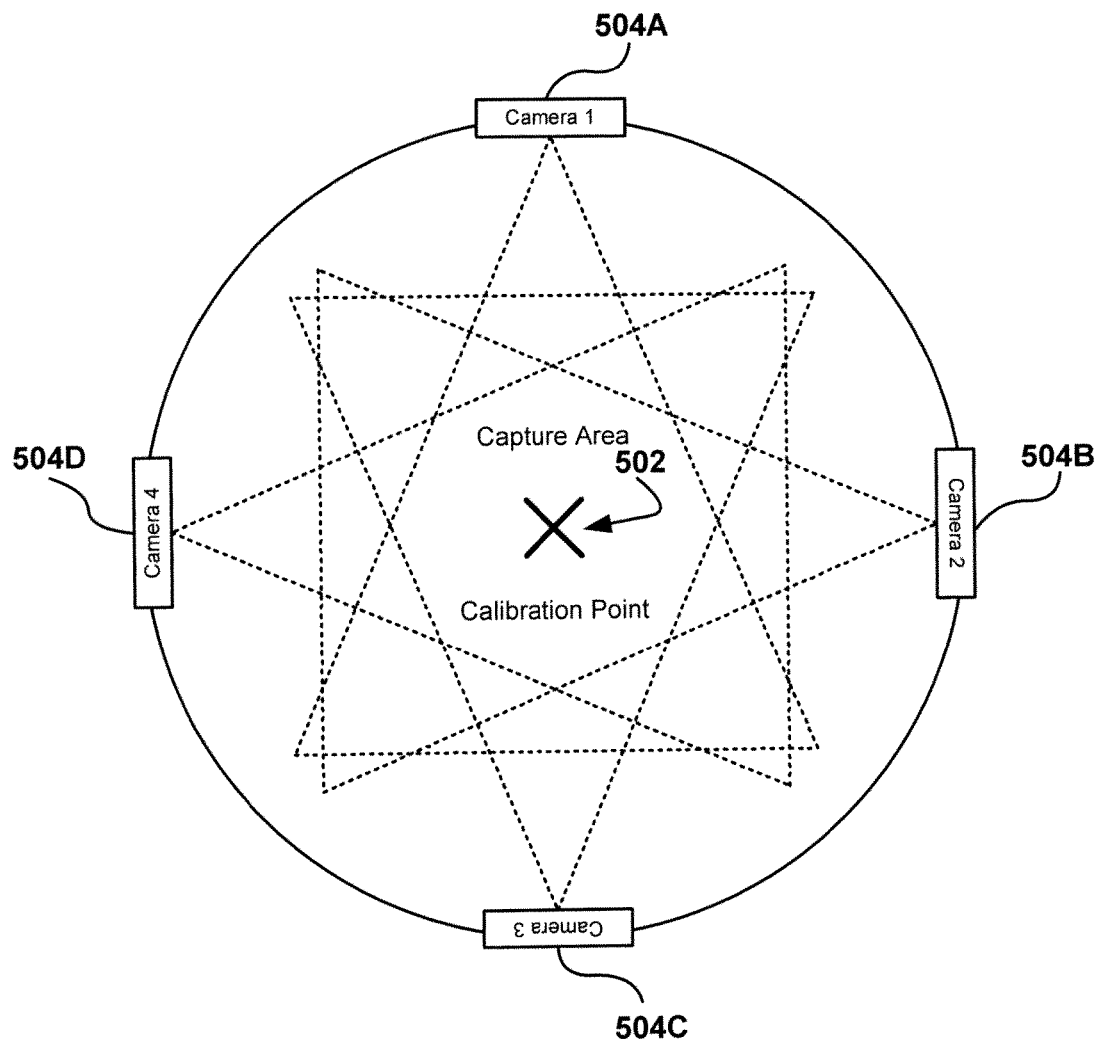
FIG. 5 illustrates one embodiment of a calibration method for a multi-player environment.

FIG. 5 illustrates one embodiment of a calibration method for a multi-player environment. As previously described, the positional information gained from the devices sensors (accelerometers, GPS, compass, depth-cam, etc.) is transmitted to other linked devices to enhance the collaboratively maintained data in the virtual space. In one embodiment for creating a common shared space synchronized to a common reference point 502, a first player 504A synchronizes her device into the 3D space with respect to reference point 502. Other players in the shared space establish a communication link with the first player to exchange position and game information. The relative position can be obtain in different ways, such as using WiFi triangulation and ping tests to determine relative positions. In addition, visual information can be used to determine other locations, such as detecting faces of other players and from their faces, possible locations of gaming devices.

In one embodiment, audio triangulation is used to determine relative position, by means of ultrasonic communications and directional microphones. Multiple frequencies can be used to perform the audio triangulation. Once the devices have exchanged position information, wireless communication, such as ultrasonic, WiFi, or Bluetooth, is used to synchronize the rest of the devices to reference point 502. After all the devices are calibrated, the devices have knowledge of the reference point 502 and their relative position with respect to reference point 502. It should be appreciated that other methods can be used to calibrate multiple devices to a shared reference point. For example, all devices may calibrate to the same reference point by placing the device on the reference point in turns.

The virtual scene can be made even more realistic by using shadows and lighting determined by the lighting sources in the room. By using camera feeds, game environments and characters have scene lighting and shadows influenced by the real world. This means that a player's hand will cast a shadow over virtual characters or objects as the hand are reaches into the virtual world to interact with the virtual objects. Game world shadows and lighting are adjusted by real world shadows and lighting to get the best effect possible.

Figure 6:
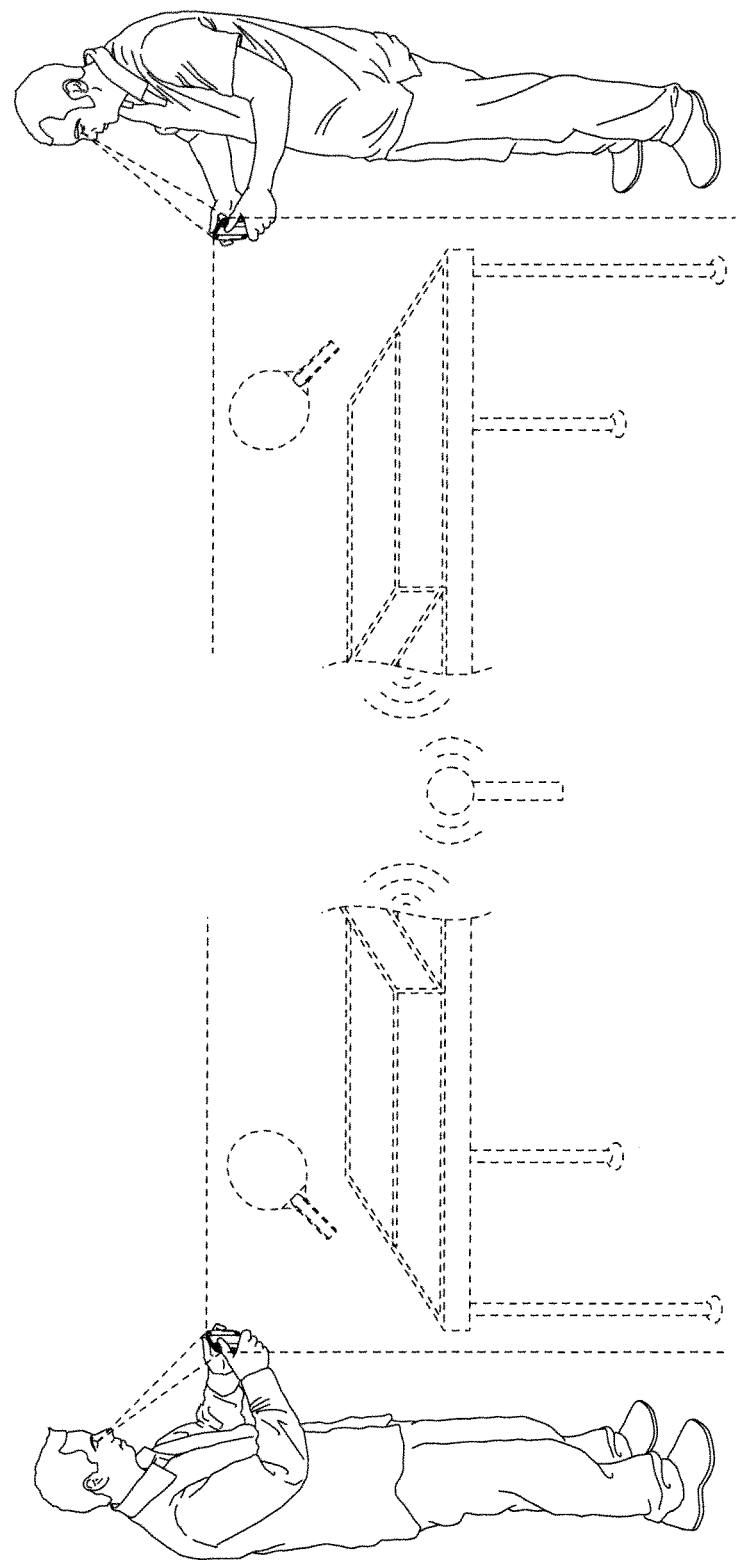
FIG. 6 illustrates how to play an interactive game over a network connection, according to one embodiment.

FIG. 6 illustrates how to play an interactive game over a network connection, according to one embodiment. Many types of games are possible within a Shared Space. For example, the portable device can be used as a paddle to play a game of ping-pong. The device is moved around as if it where a paddle to hit the ball. Players see the ball float between the screen and the opponent's screen. In a war game, the player looks through the portable device and aims the catapult at the enemies' ramparts. The player pulls the device backwards to load the catapult, and then press a button to fire the catapult toward the enemies' castle.

Shared Spaces can also be created when players are in different locations, as shown in FIG. 6. The players have established a network connection to play the game. Each player synchronizes his device to a reference point in the player's space, and a virtual reality is created, such as a ping-pong table. The opponent is shown behind his side of the table, where the movement of an opponent's device is matched to the motions of the opponent's paddle. The game may also add an avatar to hold the paddle, for an even more realistic game experience. During play, each device keeps track of the motion and position in space of the device. This information is shared with the other device to enable the other device to place a virtual paddle matching the motion of the device. Other game information is also shared, such as the location and movement of the ball.

Figure 7:
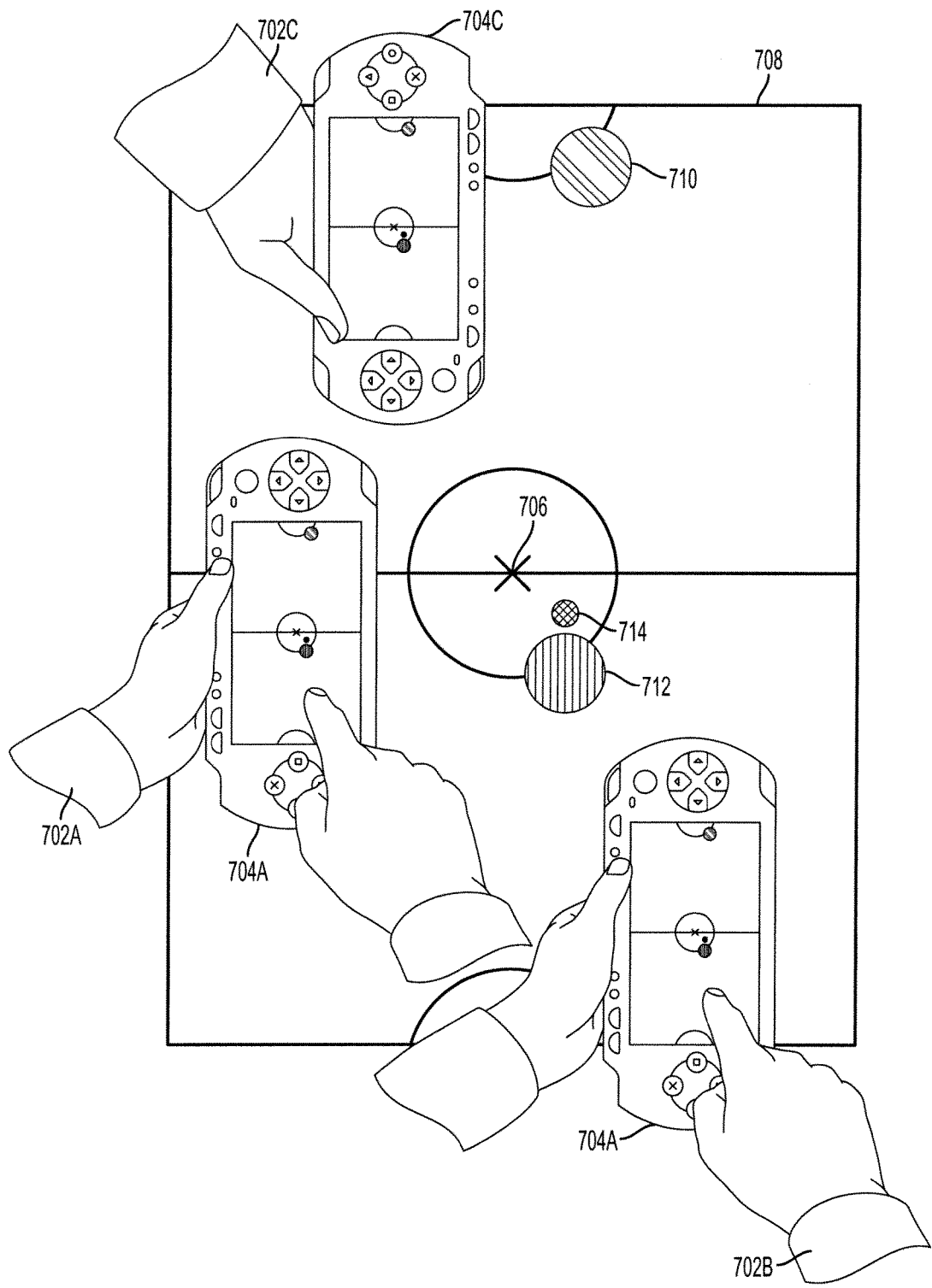
FIG. 7 shows an interactive game that is independent of the location of the portable device.

FIG. 7 shows an interactive game that is independent of the location of the portable device. The game illustrated in FIG. 7 shows the limitations for playing games that do not synchronize with respect to reference point 706. A multi-player air hockey game is played simultaneously on two separate devices, 704C and 702A. The game includes a hockey ring 708, puck 714, and mallets 710 and 712. Each player controls the mallet by moving the finger on the display. The displays show the location of the puck and the mallets. However, the view on the display does not change when the portable device moves around because there is no geographical synchronization with a reference point. For example, when player 702A moves to location 702B, the view is the same, independent of where the device is located.

In order to play the game, the portable devices only exchange information regarding the movement of the puck and the location of the mallets. There is no virtual experience tied to a 3D space.

Figure 8:
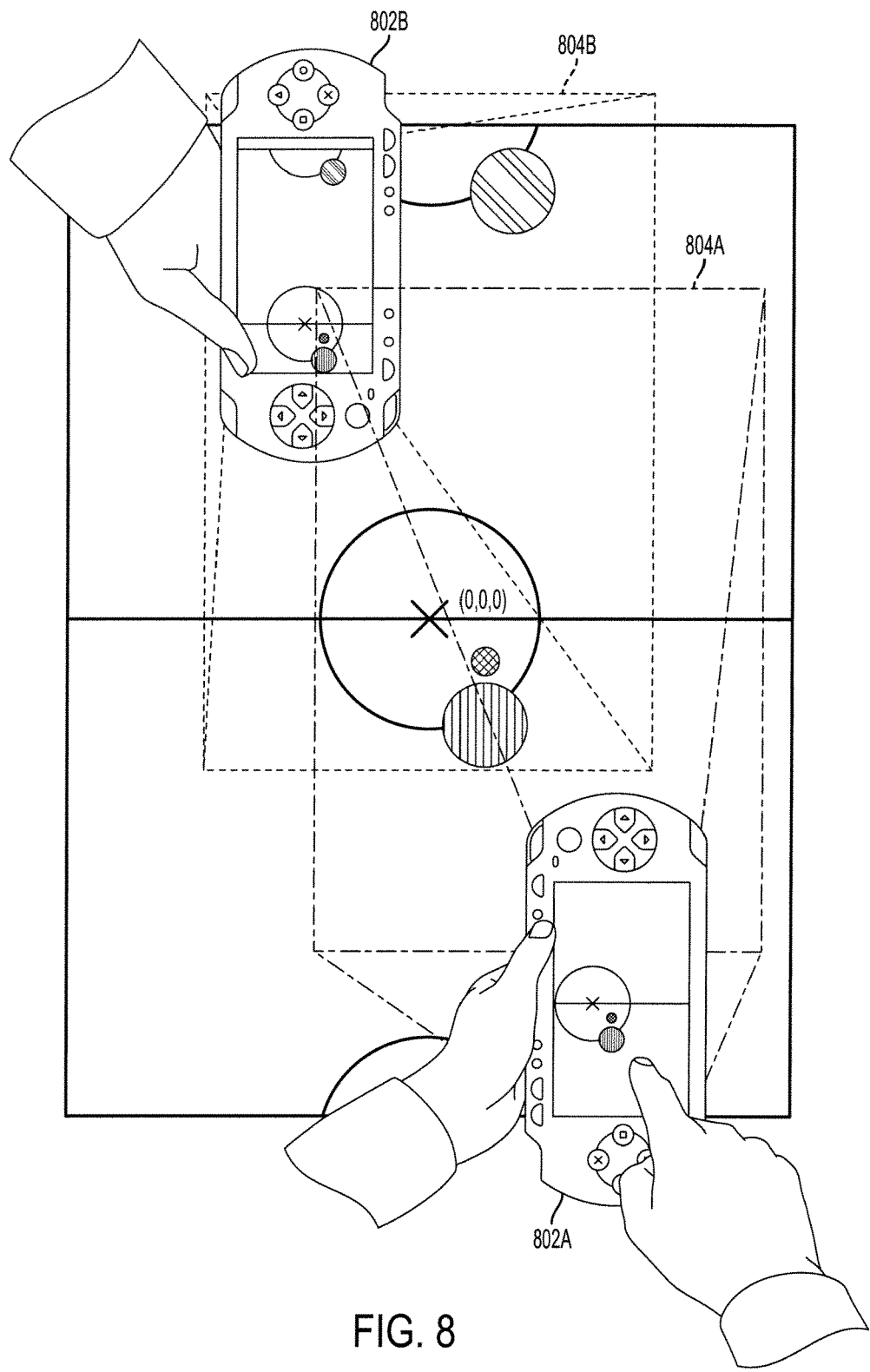
FIG. 8 shows an interactive game where the view in the display depends on the position of the portable device, in accordance with one embodiment.

FIG. 8 shows an interactive game where the view in the display depends on the position of the portable device, in accordance with one embodiment. Devices 802A and 802B have been calibrated to a common space and the hockey ring has been created as a virtual element. The devices acts as cameras into the space, and the devices don't necessarily have to show the complete playing surface. For example, when the device is pulled away from the reference point, a zoom out effect takes place and a larger view of the ring is available. Further, if the device is tilted upward, the view shows the top of the ring and if the device is tilted down, the view in the device gets closer to the player's own goal. As seen in FIG. 8, the views in the displays are independent of each other and are based on the current view of the playing surface from each portable device.

Figure 9:
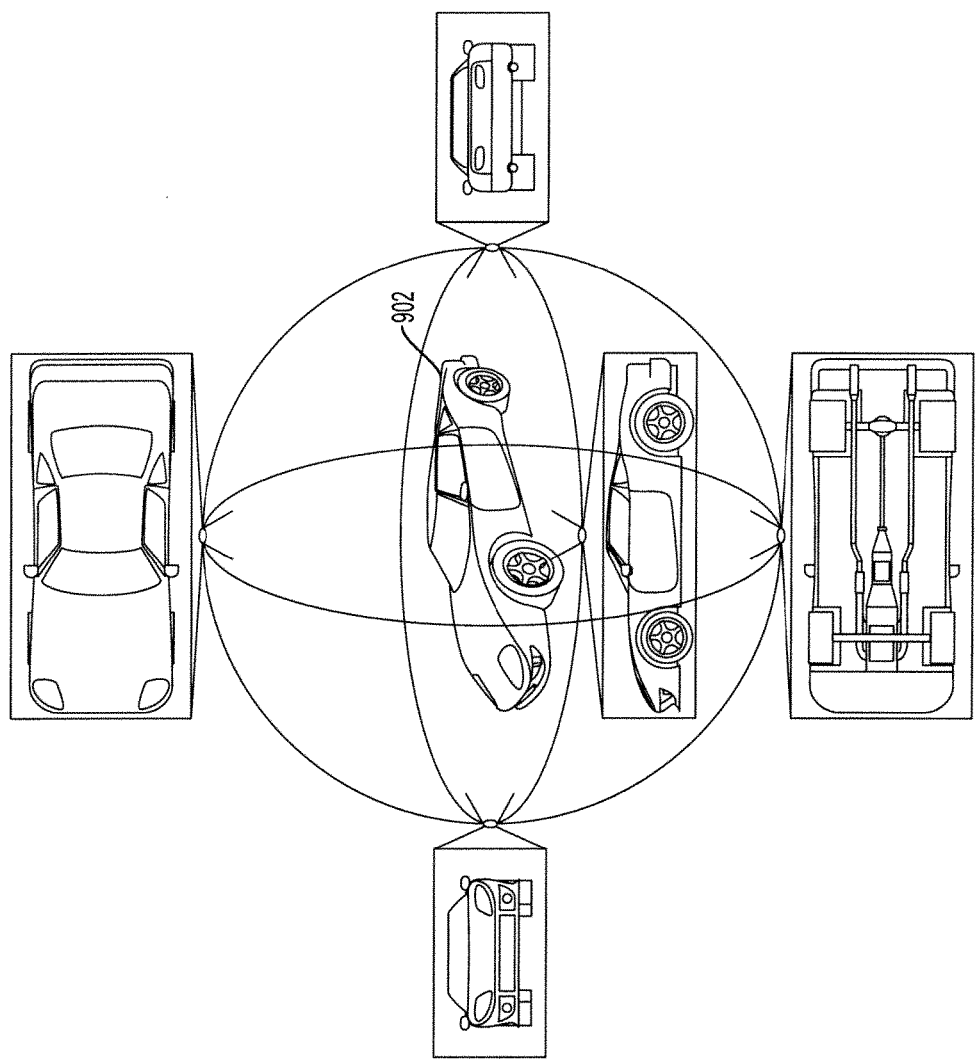
FIG. 9 illustrates how movement of the portable device has a similar effect on the display as when moving a camera in the virtual space, according to one embodiment.

FIG. 9 illustrates how movement of the portable device has a similar effect on the display as when moving a camera in the virtual space, according to one embodiment. FIG. 9 shows car 902 inside a virtual sphere. Assuming that a portable device is aimed from a point in the sphere towards car 902, multiple views of the car can be obtained as the portable device moves within the sphere. For example, a view from the "north pole" will show the roof of the car, and a view from the "south pole" will show the bottom of the car. Also shown in FIG. 9 are views for the side, front, and rear of the car.

In one embodiment, the player can enter a command to change or flip the view of the virtual world. For example, in the case of the car, a player goes from seeing the front of the car to seeing the back of the car, as if the scene had rotated 180° around and axis running vertically through the reference point. This way, the player does not have to move around the room to get different viewing angles. Other inputs may produce different effects, such as a 90° turn, a scaling of the view (to make the virtual world seem smaller or greater), rotate with respect to the x, y, or z axis, etc. In another embodiment, a flip of the portable device, i.e., a 180° spin on the player's hand, will cause view of the virtual world to flip upside down.

Figure 10:
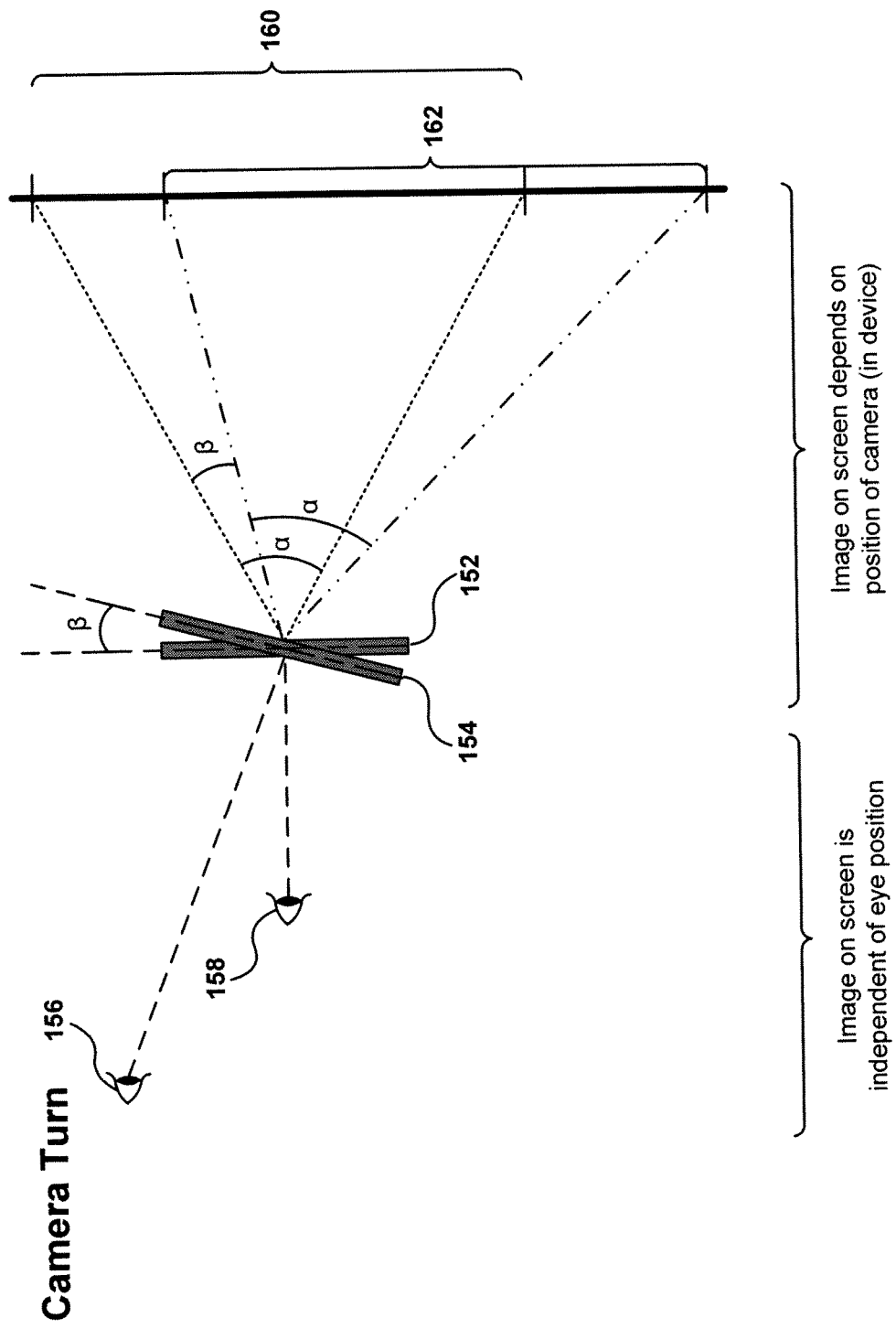
FIG. 10 shows a two-dimensional representation of the change in the image shown in the display when turning the portable device, according to one embodiment.

FIG. 10 shows a two-dimensional representation of the change in the image shown in the display when turning the portable device, according to one embodiment. Portable device 152 is aimed towards a wall with a viewing angle α, resulting in a projection 160 on the wall. Thus, the view on portable device 152 will correspond to projection 160. When device 152 is turned an angle β, the portable device ends in position 154. The view also turns an angle βwhile maintaining a camera viewing angle α. As a result, the view on the portable device corresponds to projection 162. It should be noted that the view on the screen is independent of the eye position, such as positions 158 and 156, and the view is independent of where the player is. Additionally, the image on the display depends on the position of the portable device, which is acting as a virtual camera. Other embodiments described below include views on the display that change according to the position of the eye.

Figure 11:
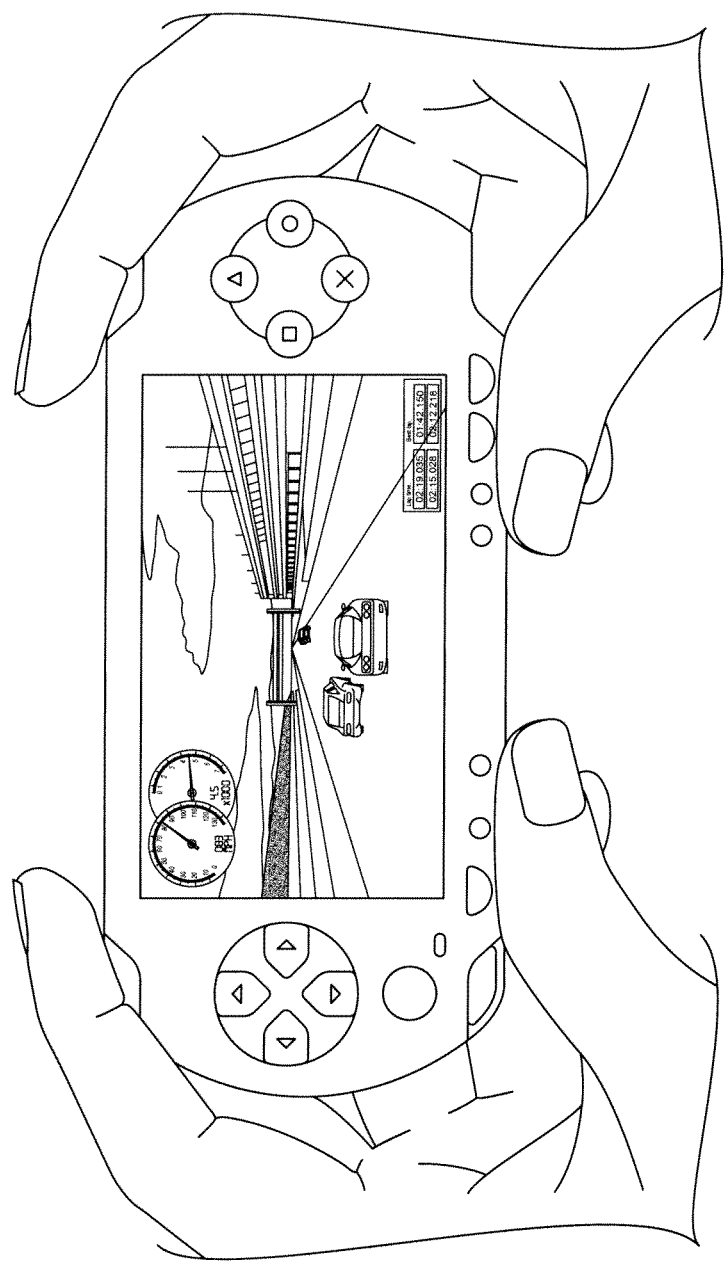
FIG. 11 shows a portable for playing a VR game, according to one embodiment.

FIG. 11 shows a portable for playing a VR game, according to one embodiment. FIGS. 11 to 12F illustrate a racing game where the portable device can be used as a camera or to control the driving of the vehicle. The portable device shows a view of the race, where the race track is seen in the center with other racing cars and people sitting on the stands on the side of the track.

Figure 12A:
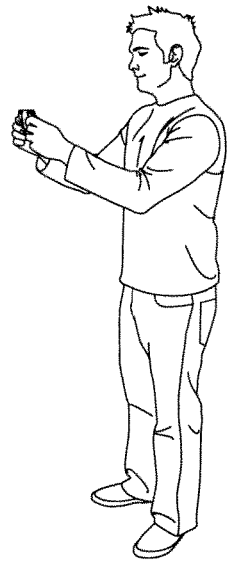
FIGS. 12A-12F illustrate how the position of the portable device affects the view in the display, according to one embodiment.
Figure 12C:
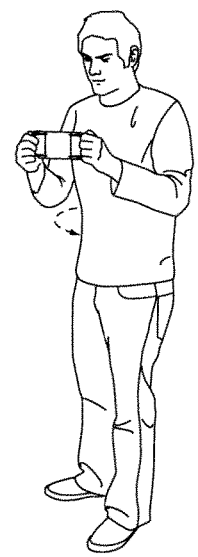
Figure 12B:
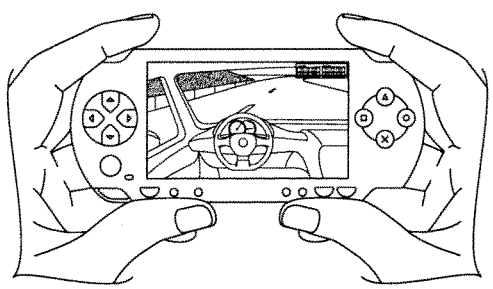
Figure 12D:
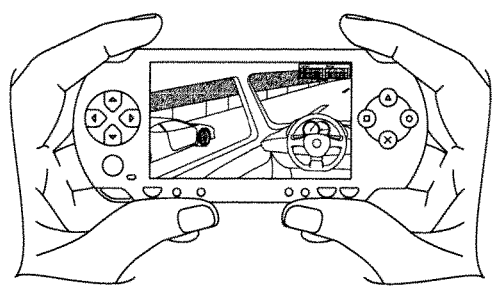
Figure 12E:
Figure 12F:
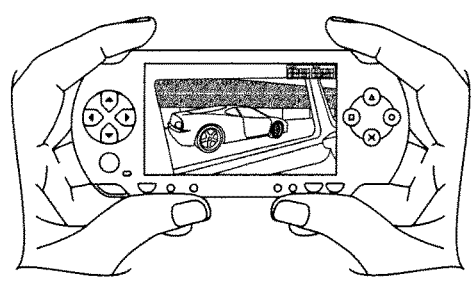

FIGS. 12A-12F illustrate how the position of the portable device affects the view in the display, according to one embodiment. In this sequence, the portable device is being used as a camera, and not to drive the car. FIG. 12A shows the player holding the portable device to play the racing game. The device is being held in front of the player at approximately arm's length. The view of the game when the player is in the position shown in FIG. 12 A is the one illustrated in FIG. 12B, where the view on the display shows the race as seen by the car driver. The driver can see the track ahead and a part of the inside of the vehicle, including the steering wheel.

FIG. 12C shows the player turning left about 45° while still holding the portable device in front of him. As a result the portable device moves in space together with player. The result of the movement of the player is seen in FIG. 12D, where the view of the race track has also turned about 45°. It can be seen that the portable device is acting as a camera and the view on the display changes as if the camera changed position in the 3D world.

FIG. 12E shows the player turning left an additional 45°. As a result, the head and the viewing angle of the portable device has changed about 90° with respect to the original position. The result on the display is pictured in FIG. 12F, where the driver of the game has now a side view, which includes another racing car and the stands.

Figure 13A:
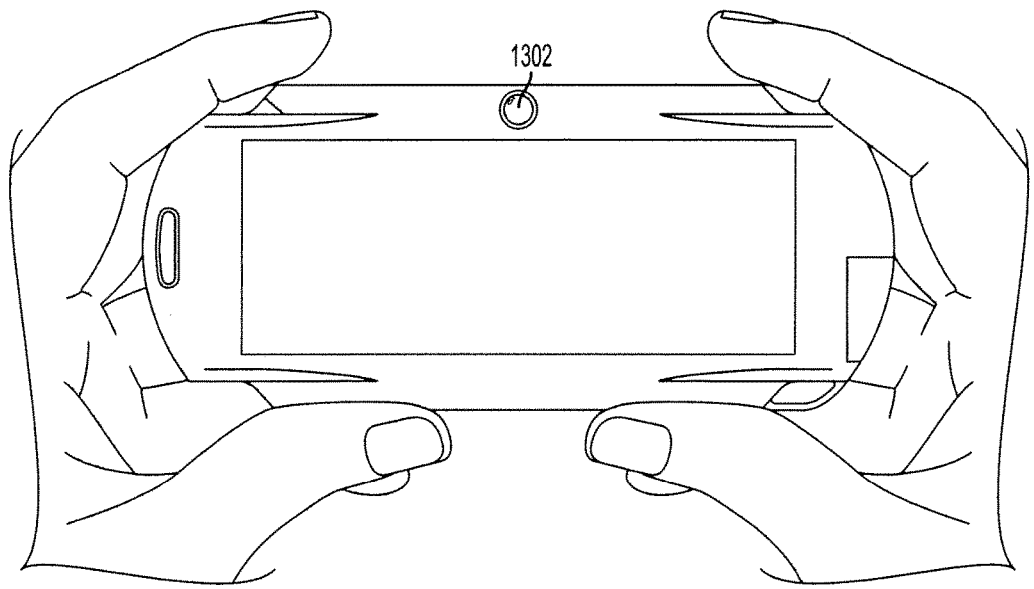
FIGS. 13A-13B illustrate an augmented reality game played between users in distant locations, according to one embodiment.
Figure 13B:
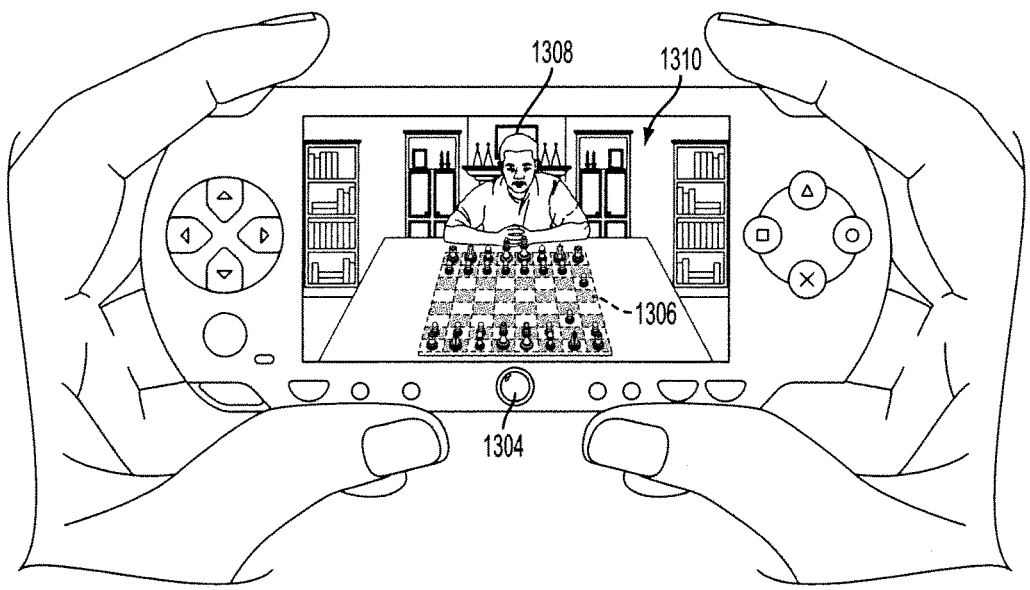

FIGS. 13A-13B illustrate an augmented reality game played between users in distant locations, according to one embodiment. FIG. 13A shows a portable device with camera 1302 facing the player holding the portable device. The player-facing camera has many uses, such as teleconferencing, viewing frustum applications (see FIGS. 15-19B), incorporation of player's face in a game, etc.

FIG. 13B shows an embodiment of an augmented reality game that produces a realistic proximity effect. Player 1308 is in a remote location and exchanges game and environment information via a network connection. A camera in the remote location takes a picture of the player and his vicinity, such as background 1310. The image is sent to the opponent's device, where the image is blended with a virtual chess board 1306. Similarly, camera 1304 takes a picture of the player holding the device and sends the image to the remote player. This way the players can share a space.

Each player sees his view as an augmented reality that fades into a virtual reality fog as the view crosses over into the other player's scene. All movements for each player are still tracked relative to the synchronized calibrated positions for both devices. The game inserts the virtual chess board on top of the table offering a 3D experience. As previously described, the portable device can move around to change the viewing angle and see the board from a different perspective, such as from the top, the side, the opponent's view, etc.

In one embodiment, communications and processing bandwidth required are decreased by updating the face and background from the opponent periodically, instead of using a live-feed. Additionally, it is possible to send only a portion of the remote image, such as the image of the player since the background may be static and less relevant. For example, the face of the remote player can be updated every five seconds, every time the player changes expression, when the player talks, etc.

In another embodiment, sound can also be exchanged between players to make the 3D experience more realistic. In yet another embodiment, players have the option of changing views, such as switching between the blended 3D image and displaying only the chess board to improve the view of the board. In yet another embodiment, image stabilization can be used to stabilize small image variations due to slight shaking of the player's hands. In one embodiment, the face of the player holding the device can also be added to the display to show how the user appears to the opponent.

FIGS. 14A-14H depict the changes in the display as the portable device changes position, according to one embodiment. In the sequence of FIGS. 14A-14H, a portable device is using a viewing frustum effect to determine how the augmented reality world is presented to the user.

In current 3D computer graphics, the viewing frustum or view frustum is the region of space in the modeled world that may appear on the screen. The viewing frustum is the field of view of the notional camera. The exact shape of this region varies depending on what kind of camera lens is being simulated, but typically it is a frustum of a rectangular pyramid (hence the name). The planes that cut the frustum perpendicular to the viewing direction are called the near plane and the far plane. In one embodiment, the near plane corresponds to the surface of the display in the portable device. Objects closer to the camera than the near plane or beyond the far plane are not drawn.

In one embodiment, the viewing frustum is anchored (the top of the pyramid) in the eye (or between the eyes) of the player holding the portable device. The display acts as a window into the virtual reality. Therefore, the closer the "window" is to the eye, the larger the area of the virtual reality that is displayed. Conversely, the further away the "window" is from the eye, the smaller (and more detailed)

the view of the virtual reality is. The effect is similar to getting closer to a rectangular old-fashion peephole without distortion optics. The closer the eye is to the peephole, the more of the outside that can be observed.

Figure 14A:
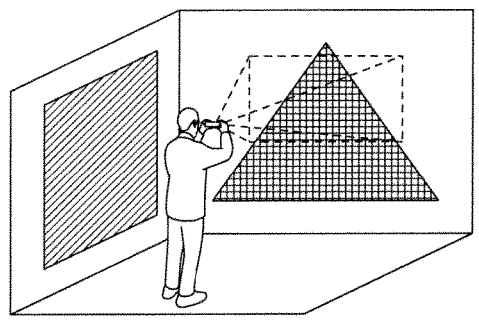
FIGS. 14A-14H depict the changes in the display as the portable device changes position, according to one embodiment.

FIG. 14A shows the player holding the augmented-reality portable device inside a room. After the device has been synchronized into the room, the virtual reality generator has added a virtual triangle "painted" on a wall facing the player, and a square "painted" on a wall to the left of the player. In FIG. 14A, the player is holding the device slightly below eye level with the arms almost completely extended. The view shown in the display is presented in FIG. 14B, where a portion of the triangle in front of the player is shown.

Figure 14C:
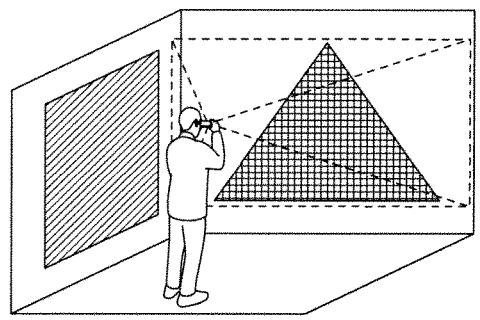
Figure 14B:
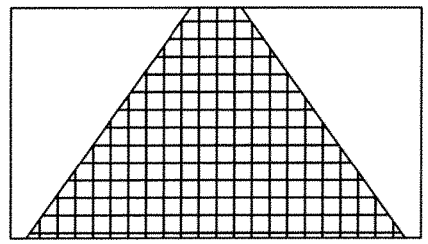
Figure 14D:
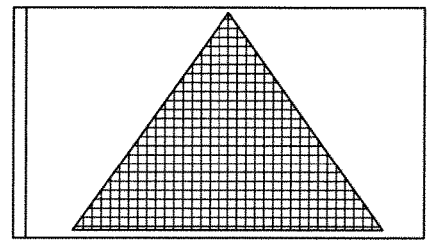

In FIG. 14C, the player is in the same position and has bent the elbows in order to bring the portable device closer to the face. Due to the viewing frustum effect, as discussed above, the player sees a larger section of the wall. FIG. 14D shows the view displayed in the device of FIG. 14C. Because of the frustum effect a larger section of the wall is observed, as compared to the previous view of FIG. 14B. The complete triangle is now seen on the display.

Figure 14E:
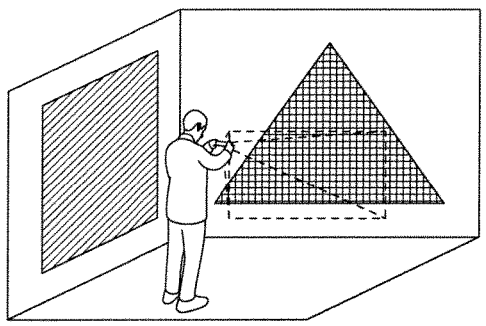
Figure 14G:
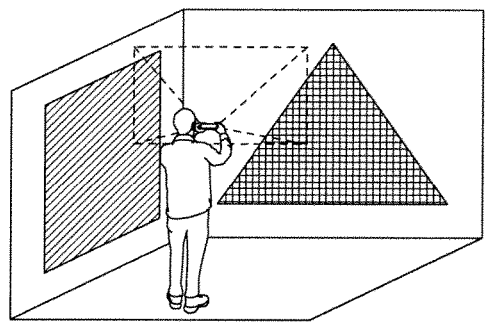
Figure 14F:
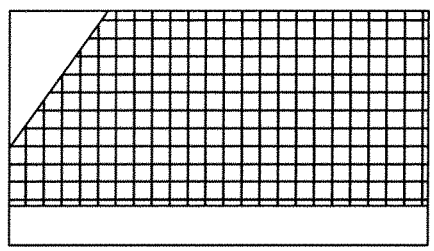
Figure 14H:
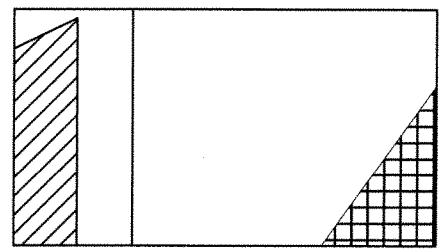

FIG. 14E shows the player moving the device down to see the bottom part of the opposing wall, as shown in FIG. 14F. A bottom section of the triangle is shown on the display. In FIG. 14G, the player as turned to the left and is using the "window" into the augmented world to see a corner of the room, as seen in FIG. 14H.

Figure 15:
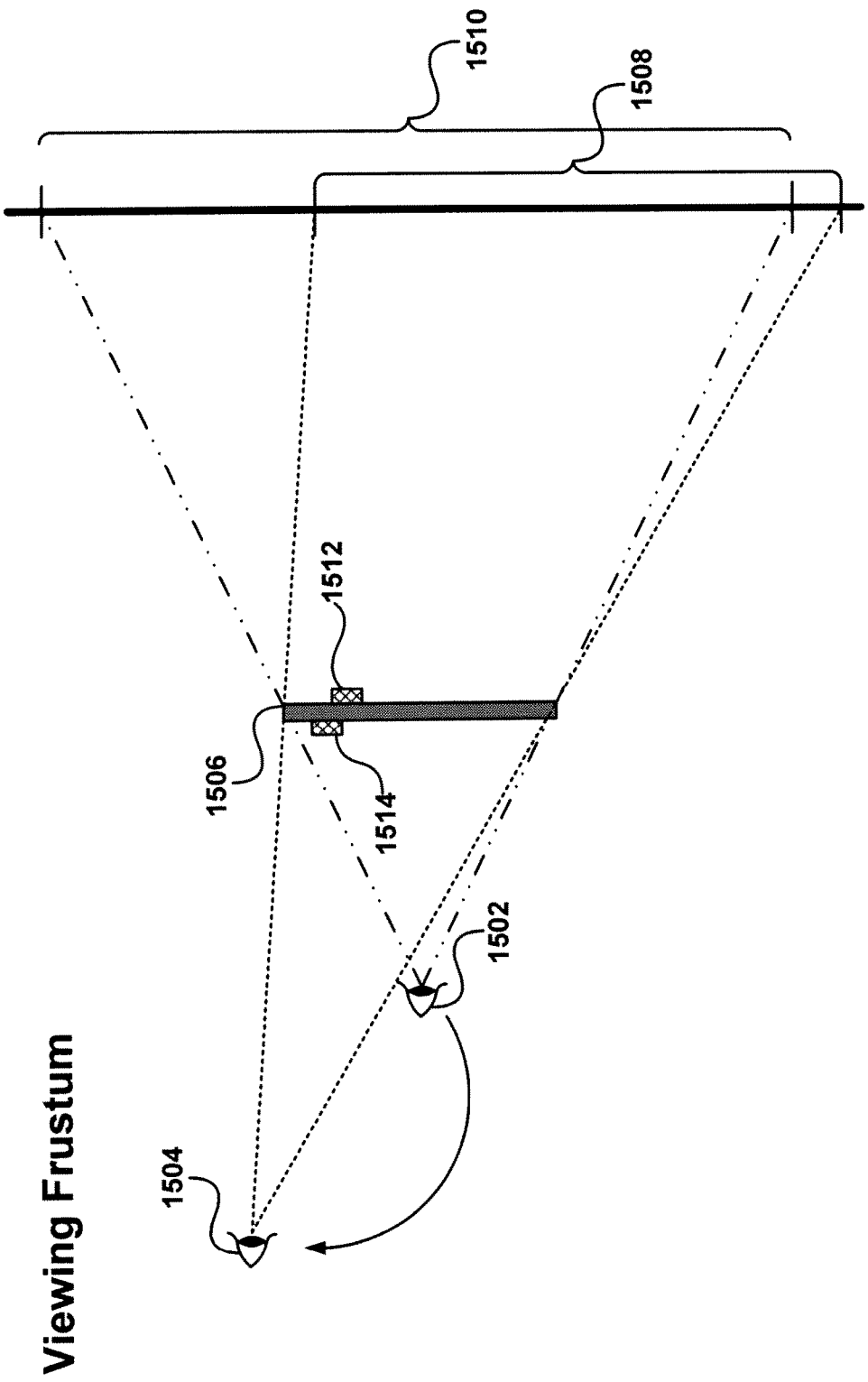
FIG. 15 illustrates an embodiment for implementing a viewing frustum on a portable device using front and rear cameras.

FIG. 15 illustrates an embodiment for implementing a viewing frustum on a portable device using front and rear cameras. FIG. 15 shows a 2D projection of the viewing frustum, and since it is a 2D projection, the viewing frustum pyramid is observed as a triangle. Portable device 1506 includes front and rear facing cameras 1514 and 1512, respectively. Camera 1512 is used to capture images of the space where the player is located. Camera 1514 is used to capture images of the player holding device 1506. Face recognition software allows the devices software to determine the location of the player's eyes in order to simulate the viewing frustum effect.

In one embodiment, the viewing frustum has the apex at the eye with the edges of the rectangular frustum pyramid extending from the eye and through the corners of the display in the handheld device. When the eye is in position 1502, the player "sees" area 1510 of a wall facing the device. Lines starting from the eye, and touching corners of the display intersect the wall to define area 1510. When the eye moves to position 1504, the lines originating at the eye change as a result. The new lines define area 1508. In summary, if portable device 1506 is kept stationary, a change of the position of the eye will cause a change in what is shown in the display. Of course, if the portable device moves then the view will also change because the viewing frustum changes as the edges of the pyramid intersect the corners of the display.

It should be appreciated that the embodiments illustrated in FIG. 15 is an exemplary implementation of a viewing frustum. Other embodiments may utilize different shapes for the viewing frustum, may scale the viewing frustum effect, or may add boundaries to the viewing frustum. The embodiment illustrated in FIG. 15 should therefore not be interpreted to be exclusive or limiting, but rather exemplary or illustrative.

FIGS. 16A-16A illustrate the effects of changing the viewing frustum as the player moves, according to one embodiment. FIG. 16A includes display 1606 in a portable device, where the surface of the display is parallel to the surface of the wall. When a player looks through the display with a viewing frustum effect, a rectangular frustum pyramid is created with an apex somewhere in the face of the player (such as between the eyes), with base on the wall, and with edges extending from the eye and touching the corners of the display 1606.

When the player is in position 1602, the viewing frustum creates a rectangular base 1610, which is what the player sees on display 1606. When the player moves to position 1604, without moving the display, the viewing frustum changes as a result. The new base for the frustum is rectangle 1608, which is seen in display 1606. The result is that a change of the position of the player causes a change in the view of the virtual reality.

Figure 16B:
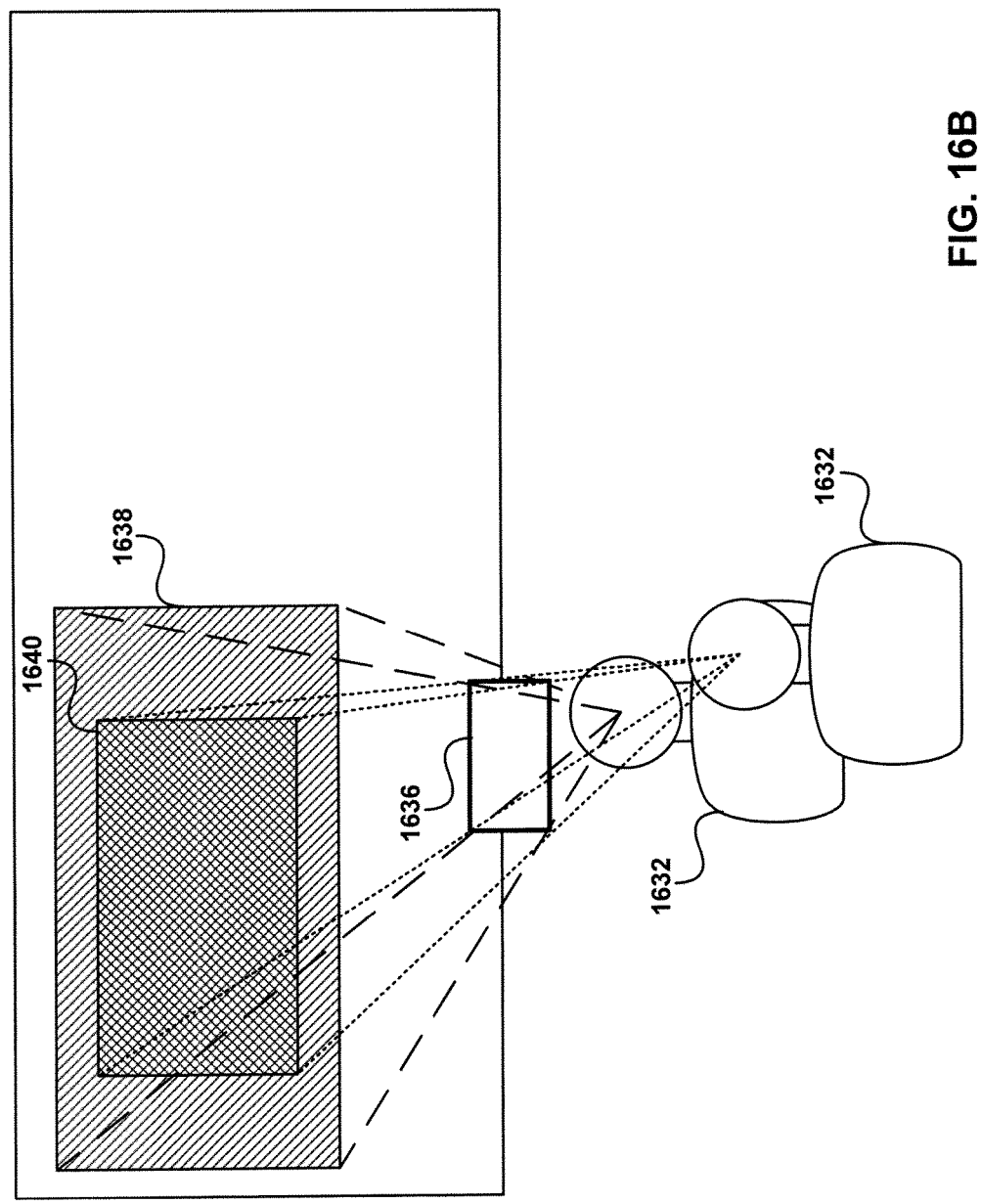

FIG. 16B illustrates the zoom effect created as the face moves away or closer to the display when using a viewing frustum effect. When the player is position 1632, player sees rectangle 1638, as previously described. If the player moves away from display 1636, without moving the display, to position 1632, a new display is seen corresponding to rectangle 1640. Thus, when the player moves away, the observed area of the virtual world shrinks causing a zoom-in effect because the observed area in the display is smaller and the objects in this observed area appear bigger on the display. An opposite motion where the player moves closer to display 1636 will cause the opposite zoom-out effect.

Figure 17:
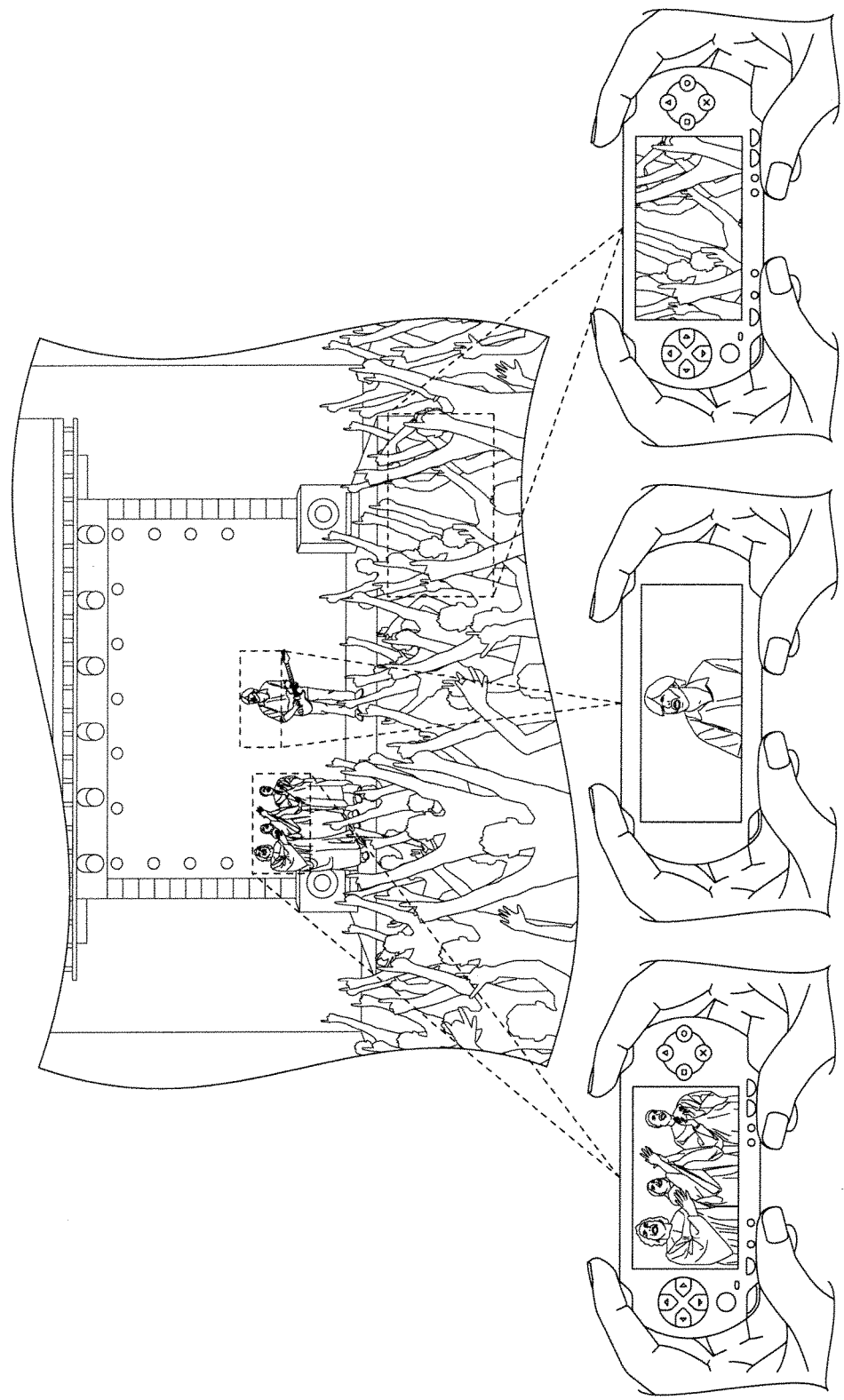
FIG. 17 illustrates how to use a virtual camera to span a view of the virtual scene, according to one embodiment.

FIG. 17 illustrates how to use a virtual camera to span a view of the virtual scene, according to one embodiment. A virtual or augmented reality does not need to be confined within the limits of the room where the player is located, as we saw before in FIG. 11 for the racing game. A virtual world that goes beyond the physical boundaries of the player can be also simulated. FIG. 17 illustrates a player viewing a virtual concert. The actual stage is located beyond the walls of the room and can be simulated to be hundreds of feet away from the portable device, which is acting as a virtual camera in this case. A viewing frustum could also be simulated in the same manner.

As observed at the bottom, different camera positions and viewing angles will cause different views on the display. For example, the first location is focused on the backup singers, the second one on the main artists, and the third location is aimed at the crowd. The virtual camera can also add zoom inputs to zoom in and out like a real camera would do.

In one embodiment, scaling is used to navigate through the virtual reality. For example, if a player moves forward one foot, the portable device will create a virtual view as if the player had advanced 10 feet. This way, a player can navigate a virtual world that is larger than the room where the player is.

In another embodiment, the player can enter commands to make the camera move within the virtual reality without actually moving the portable device. Since the portable device is synchronized with respect to a reference point, this movement of the camera without movement by the player has the effect of changing the reference point to a new location. This new reference point can be referred to as a virtual reference point, and does not have to be located within the actual physical space where the player is. For example, in the scene illustrated in FIG. 17, the player could use a "move forward" command to move the camera backstage. Once the player "is" backstage, the player can start moving the portable device around to explore the view backstage, as previously described.

Figure 18A:
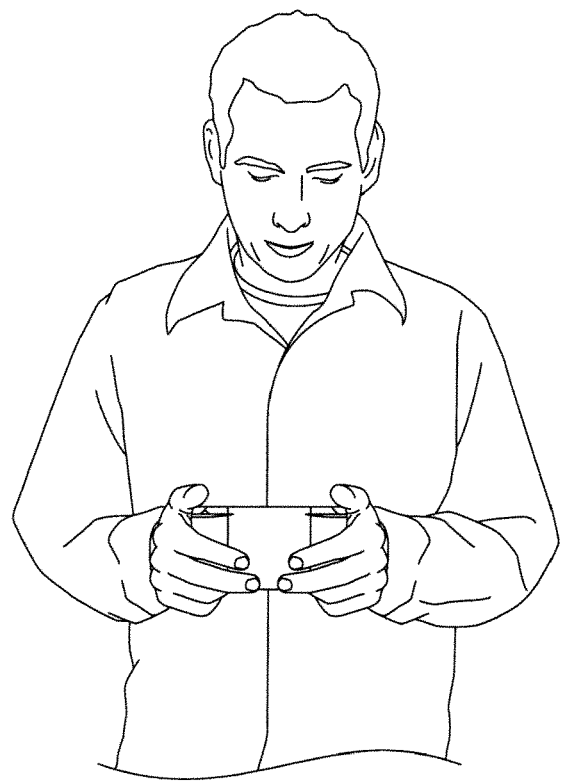
FIGS. 18A-18H show a sequence of views for illustrating the viewing frustum effect, according to one embodiment.
Figure 18B:
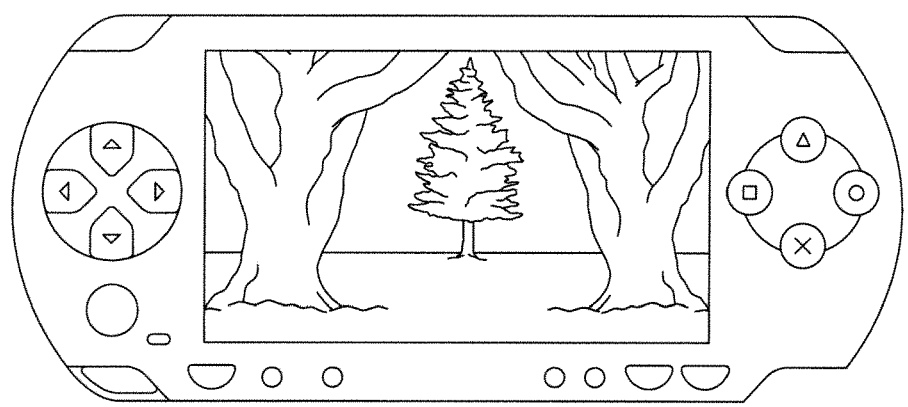
Figure 18C:
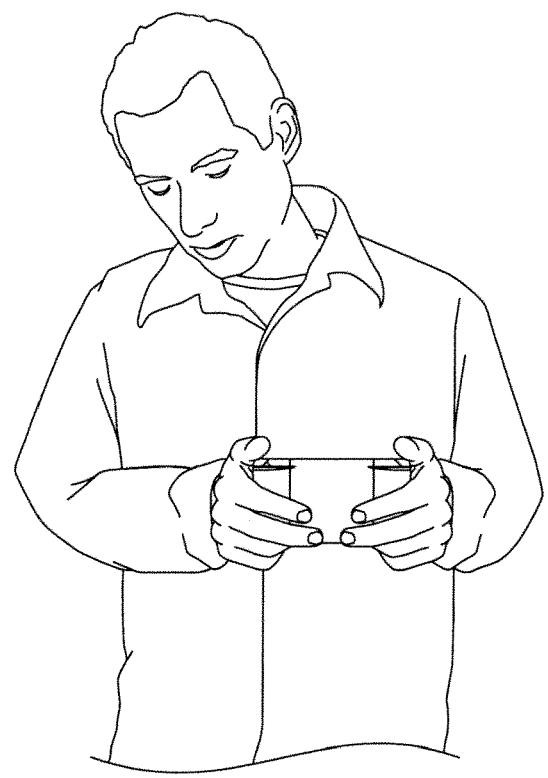
Figure 18D:
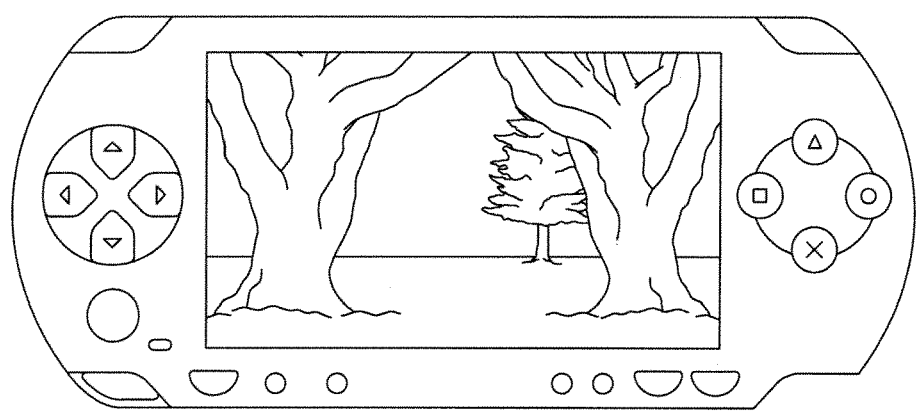

FIGS. 18A-18H show a sequence of views for illustrating the viewing frustum effect, according to one embodiment. FIG. 18A shows the player holding the portable device. The view on the display corresponds to the image of a forest shown in FIG. 18B. In FIG. 18C, the player moves his head to his right while keeping the portable device in approximately the same position as in FIG. 18A. FIG. 18D corresponds to the view for the player in FIG. 18C and shows how the perspective of the forest changes due to the viewing frustum effect.

Figure 18E:
Figure 18F:
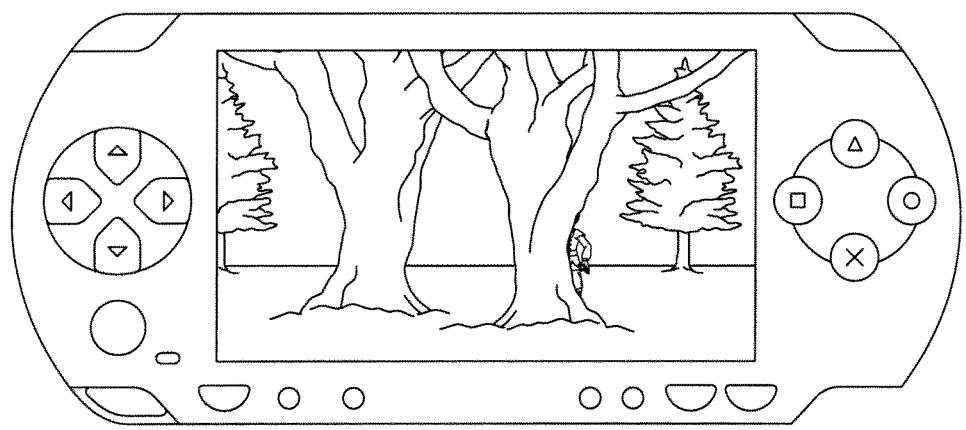
Figure 18G:
Figure 18H:
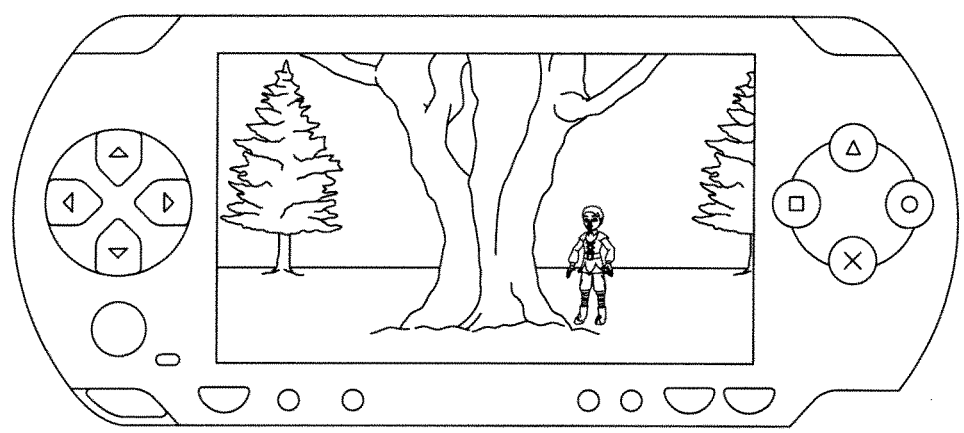

In FIG. 18E the player keeps turning the head to his right, while moving the portable device towards his left to accentuate the viewing frustum effect because the player wants to know if there is something behind the tree. FIG. 18F shows the display corresponding to the player in FIG. 18E. The perspective of the forest has changed again. There is an elf hiding behind one of the trees that was hidden in FIG. 18B, but part of the elf is visible in FIG. 18F as the player has changed the viewing angle of the forest. FIG. 18G shows the player tilting the head far to his right and moving the portable device further away to his left. The effect, as seen in FIG. 18H, is that the player is able to see now what was behind the tree, an elf that is now completely visible.

FIGS. 19A-19B illustrate embodiments for combining viewing frustum effect with a camera effect. Combining viewing frustum and camera effects may be seen as impossible as the behaviors for building the virtual view are different. However, the combination is possible when there are rules to define when to use one effect or the other. In one embodiment, the camera effect is used when the player moves the portable device, and the viewing frustum effect is used when the player moves the head with respect to the portable device. In the case where both events happen at the same time, one effect is chosen, such as viewing frustum.

This combination means that given a position of the eye and the portable device, there can be different views on the display depending on how the eye and the camera reached that position. For example, when eye 1902 is looking thorough device 1906, a different view of the virtual reality is shown in FIGS. 19A and 19B, as discussed below.

In reference to FIG. 19A, eye 1902 is originally looking thorough device 1904. The device, using a viewing frustum effect, is "aiming" into the virtual reality straight forward. This causes an α angle originating at the top of the viewing frustum pyramid, and results in a camera angle of β. Using the same 2D representation as previously described in reference to FIGS. 10 and 15, the player sees segment 1908 on the wall at this first position. The player then turns the device an angle γ to place the device in position 1906. Since the player has moved the device, the portable device responds to the move with a camera effect, causing the virtual camera to also turn an angle γ. The result is that the display now shows area 1910 of the wall.

FIG. 19B shows a player at an initial eye position 1912 looking through portable device 1906. A viewing frustum effect is being used and the result is the appearance on the display of area 1918. The player then moves to eye position 1902 without moving the portable device. Because the device has not moved, the viewing frustum effect takes place and player then sees area 1916 on the display. It should be noted that although eye 1902 and display 1906 are in the same position in FIGS. 19A and 19B, the actual view is different because the sequence of events that caused the eye and the display to be in that position.

Figure 20:
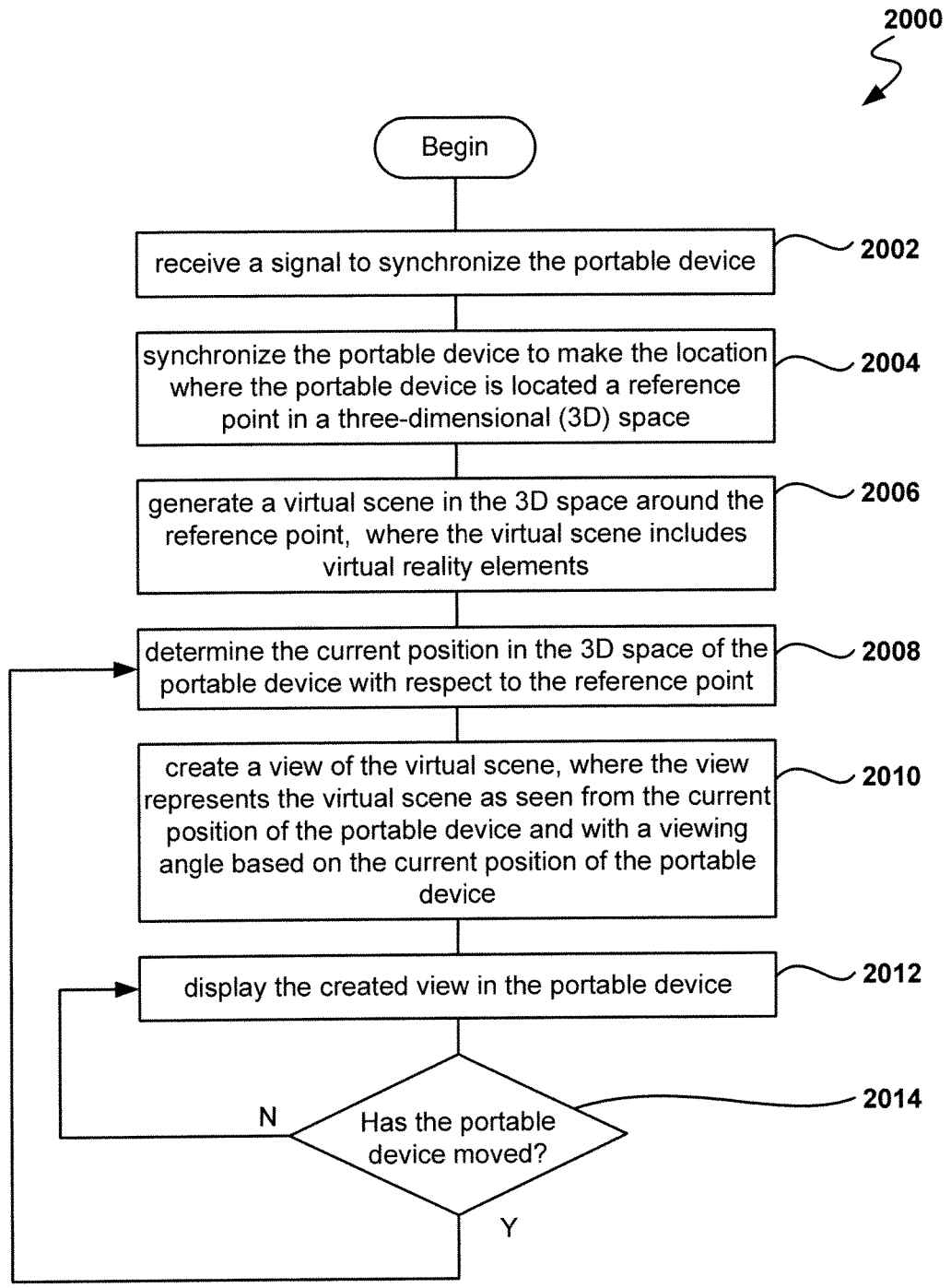
FIG. 20 shows the flow of an algorithm for controlling a view of a virtual scene with a portable device in accordance with one embodiment of the invention.

FIG. 20 shows flow 2000 of an algorithm for controlling a view of a virtual scene with a portable device in accordance with one embodiment of the invention. In operation 2002, a signal is received to synchronize the portable device, such as a button press or a screen touch. In operation 2004, the method synchronizes the portable device to make the location where the portable device is located a reference point in a three-dimensional (3D) space. In one embodiment, the 3D space is the room where the player is located. In another embodiment, the virtual reality includes the room as well as a virtual space that extends beyond the walls of the room.

A virtual scene is generated in the 3D space around the reference point during operation 2006. The virtual scene includes virtual reality elements, such as the chess board of FIG. 2. In operation 2008, the portable device determines the current position in the 3D space of the portable device with respect to the reference point. A view of the virtual scene is created in operation 2010. The view represents the virtual scene as seen from the current position of the portable device and with a viewing angle based on the current position of the portable device. Further, the created view is shown on a display of the portable device during operation 2012. In operation 2014, the portable device checks if the portable device has been moved by the user, i.e., if the current position has changed. If the portable device has moved, then the method flows back to operation 2008 to recalculate the current position. If the portable device has not moved, the portable device continues displaying the previously created view by flowing to operation 2012.

Figure 21:
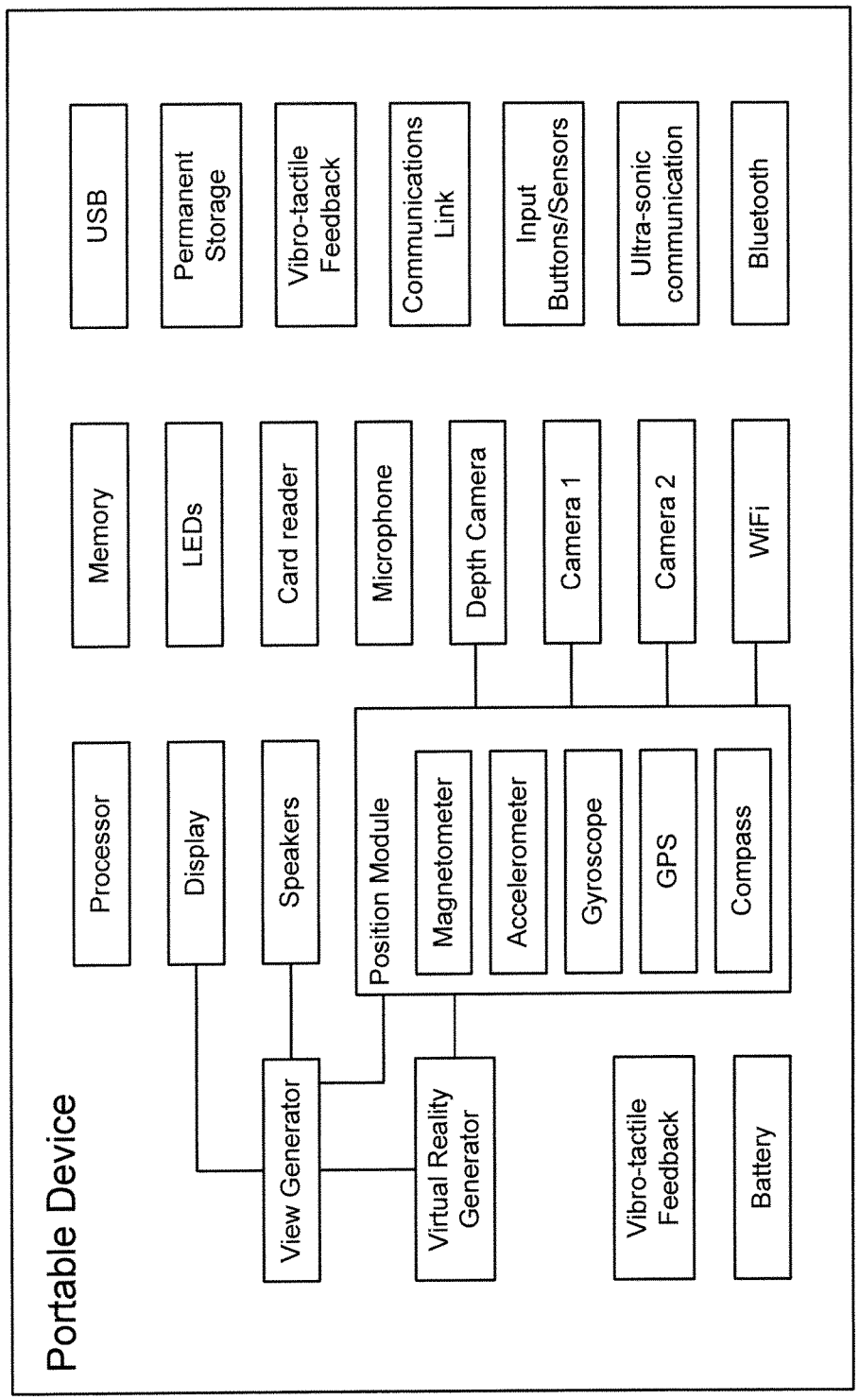
FIG. 21 illustrates the architecture of a device that may be used to implement embodiments of the invention.

FIG. 21 illustrates the architecture of a device that may be used to implement embodiments of the invention. The portable device is a computing device and include typical modules present in a computing device, such as a processor, memory (RAM, ROM, etc.), battery or other power source, and permanent storage (such as a hard disk). Communication modules allow the portable device to exchange information with other portable devices, other computers, servers, etc. The communication modules include a Universal Serial Bus (USB) connector, a communications link (such as Ethernet), ultrasonic communication, Bluetooth, and WiFi.

Input modules include input buttons and sensors, microphone, touch sensitive screen, cameras (front facing, rear facing, depth camera), and card reader. Other input/output devices, such as a keyboard or a mouse, can also be connected to the portable device via communications link, such as USB or Bluetooth. Output modules include a display (with a touch-sensitive screen), Light-Emitting Diodes (LED), vibro-tactile feedback, and speakers. Other output devices can also connect to the portable device via the communication modules.

Information from different devices can be used by the Position Module to calculate the position of the portable device. These modules include a magnetometer, an accelerometer, a gyroscope, a GPS, and a compass. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator creates the virtual or augmented reality, as previously described, using the position calculated by the Position Module. A view generator creates the view that is shown on the display, based on the virtual reality and the position. The view generator can also produce sounds originated by the Virtual Reality Generator, using directional effects that are applied to a multi-speaker system.

It should be appreciated that the embodiment illustrated in FIG. 21 is an exemplary implementation of a portable device. Other embodiments may utilize different modules, a subset of the modules, or assign related tasks to different modules. The embodiment illustrated in FIG. 21 should therefore not be interpreted to be exclusive or limiting, but rather exemplary or illustrative.

Figure 22:
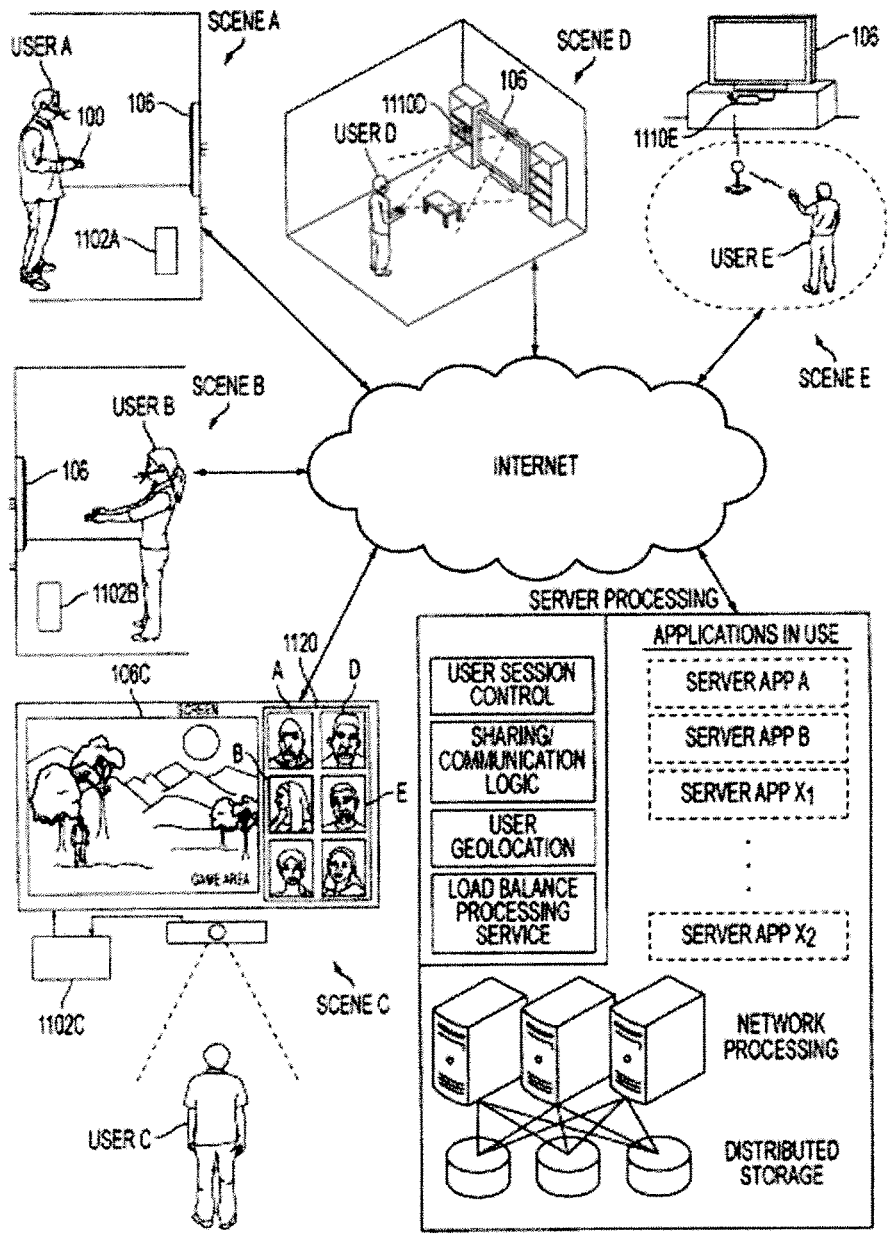
FIG. 22 is an exemplary illustration of scene A through scene E with respective user A through user E interacting with game clients 1102 that are connected to server processing via the internet, in accordance with one embodiment of the present invention.

FIG. 22 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 22, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 22 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 23:
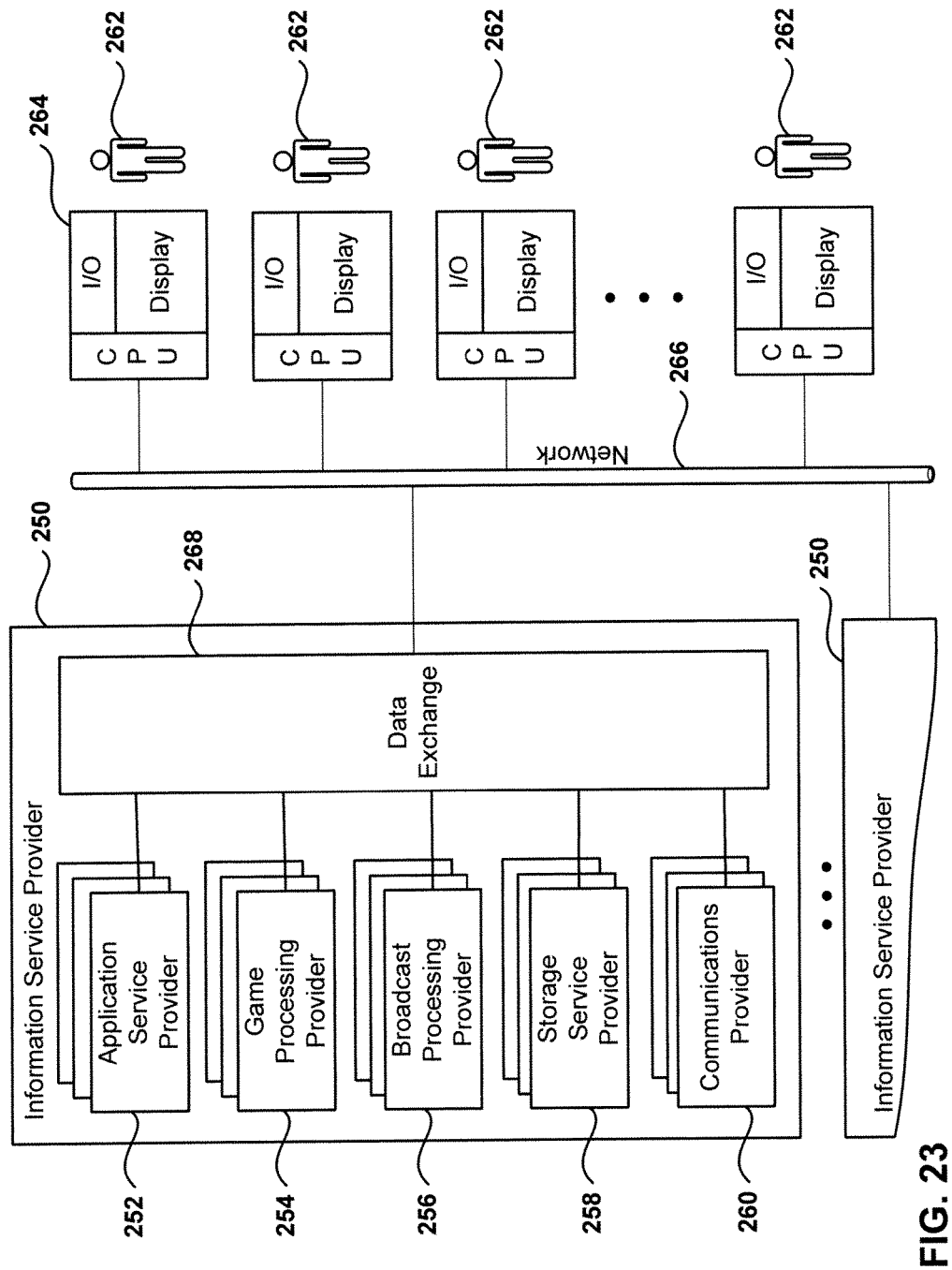
FIG. 23 illustrates an embodiment of an Information Service Provider architecture.

FIG. 23 illustrates an embodiment of an Information Service Provider architecture. Information Service Providers (ISP) 250 delivers a multitude of information services to users 262 geographically dispersed and connected via network 266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

Information Service Providers (ISP) 250 delivers a multitude of information services to users 262 geographically dispersed and connected via network 266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    receiving, by a device, remote images of a remote real world scene sent by a remote device, the device being held by a user and the remote device being operated by a remote user;
    capturing local images of a local real world scene using a camera of the device;
    processing, by the device, an augmented view for presentation on a display screen of the device by combining a part of the remote images with a part of the captured local images and one or more virtual reality objects, wherein the augmented view simulates that the user and the remote user share a same space, the combining blends said parts of the remote images and the captured local images along with the one or more virtual reality objects;
    capturing a hand of the user by the camera of the device, the camera configured to determine depth information of the hand in the local real world scene;
    detecting an interaction of the hand with a first virtual reality object from the one or more virtual reality objects when the hand makes virtual contact in the augmented view with the first virtual reality object, the depth information of the hand used to determine said interaction; and
    updating the augmented view to the device based on the interaction of the hand with the first virtual reality object to simulate that the hand is touching or moving the first virtual reality object.

2. The method as recited in claim 1, further including:
    transmitting, from the device to the remote device, data regarding the interaction of the hand with the first virtual reality object and one or more of the captured local images of the local real world.

3. The method as recited in claim 2, wherein the remote device is another device configured to present another augmented view that is updated based on changes to the first virtual reality object due to the interaction of the hand.

4. The method as recited in claim 1, wherein the interaction of the hand is an action on the first virtual reality object selected from a group consisting of holding, pushing, pulling, moving, hitting, throwing, opening, closing, turning on or off, pushing a button, firing a weapon, or eating the first virtual reality object.

5. The method as recited in claim 1, wherein creating the augmented view further includes:
    determining a location of the device utilizing one or more of image analysis of the captured local images of the local real world scene, or data obtained from inertial systems within the device, or GPS, or ultrasonic triangulation, or WiFi communications, or dead reckoning.

6. The method as recited in claim 1, wherein creating the augmented view further includes:
    detecting a table in the remote real world scene using image recognition of the remote images; and
    placing in the augmented view a virtual object on top of the table as if the virtual object was resting on the table.

7. The method as recited in claim 1, wherein the interaction of the hand includes grabbing the first virtual reality object.

8. The method as recited in claim 7, wherein the interaction of the hand includes moving the first virtual reality object after the hand grabs the first virtual reality object.

9. The method as recited in claim 1, wherein the first virtual reality object is a chess piece, wherein the interaction of the hand includes one or more of grabbing the chess piece, or moving the chess piece, or releasing the chess piece, wherein the method further includes:
    detecting that the hand has moved the chess piece; and
    transmitting the move of the chess piece to the remote device.

10. The method as recited in claim 1, further including:
    tracking a position of the device over time; and
    adjusting the augmented view based on the position of the device.

11. The method as recited in claim 10, wherein the device tracks a position of the device with reference to a reference point, wherein the augmented view simulates that the device moves around the reference point.

12. The method as recited in claim 1, wherein the remote images are associated with the remote user playing a game with the user, wherein the one or more virtual reality objects are game objects, the method further including:
    receiving remote interaction data from the remote device; and
    updating the one or more virtual objects in the augmented view based on the received remote interaction data.

13. A device, comprising:
    a communications module configured to receive remote images of a remote real world scene sent by a remote device, the device held by a user and the remote device being operated by a remote user;
    a camera for capturing local images of a local real world scene using the device; and
    a display screen; and
    a processor configured to process an augmented view for presentation on the display screen by combining a part of the remote images with a part of the captured local images and one or more virtual reality objects, wherein the augmented view simulates that the user and the remote user share a same space, the combining blends said parts of the remote images and the captured local images along with the one or more virtual reality objects, the camera of the device is configured to determine depth information of the hand in the local real world scene;
    wherein the processor detects an interaction of the hand with a first virtual reality object from the one or more virtual reality objects when the hand makes virtual contact in the augmented view with the first virtual reality object, the depth information of the hand used to determine said interaction, wherein the processor updates the augmented view to the device based on the interaction of the hand with the first virtual reality object to simulate that the hand is touching or moving the first virtual reality object.

14. The device as recited in claim 13, wherein the interaction of the hand is an action on the first virtual reality object selected from a group consisting of holding, pushing, pulling, moving, hitting, throwing, opening, closing, turning on or off, pushing a button, firing a weapon, or eating the first virtual reality object.

15. The device as recited in claim 13, wherein the processor determines a location of the device utilizing one or more of image analysis of the captured local images of the local real world scene, or data obtained from inertial systems within the device, or GPS, or ultrasonic triangulation, or WiFi communications, or dead reckoning.

16. The device as recited in claim 13, wherein when the processor detects a table in the remote real world scene using image recognition of the remote images, the processor places in the augmented view a virtual object on top of the table as if the virtual object was resting on the table.

17. The device as recited in claim 13, wherein the interaction of the hand includes moving the first virtual reality object after the hand grabs the first virtual reality object.

18. A non-transitory computer-readable storage medium storing a computer program, the computer-readable storage medium comprising:
    program instructions for receiving, by a device, remote images of a remote real world scene sent by a remote device, the device held by a user and the remote device being operated by a remote user;
    program instructions for capturing local images of a local real world scene using the device;
    program instructions for processing, by the device, an augmented view for presentation on a display screen of the device by combining a part of the remote images with a part of the captured local images and one or more virtual reality objects, wherein the augmented view simulates that the user and the remote user share a same space, the combining blends said parts of the remote images and the captured local images along with the one or more virtual reality objects;
    program instructions for capturing a hand of the user by the camera of the device, the camera configured to determine depth information of the hand in the local real world scene;
    program instructions for detecting an interaction of the hand with a first virtual reality object from the one or more virtual reality objects when the hand makes virtual contact in the augmented view with the first virtual reality object, the depth information of the hand used to determine said interaction; and
    program instructions for updating the augmented view to the device based on the interaction of the hand with the first virtual reality object to simulate that the hand is touching or moving the first virtual reality object.

19. The storage medium as recited in claim 18, wherein creating the augmented view further includes:
    program instructions for adding a shadow of the hand over the one or more virtual reality objects according to lighting conditions in the real world scene.

20. The storage medium as recited in claim 18, further including:
    program instructions for receiving, by the device, an update of a face of the remote user; and
    program instructions for updating the face of the remote user in the augmented view while leaving a background unchanged in the augmented view.

* * * * *